(12) United States Patent
Watanabe

(10) Patent No.: US 11,323,313 B2
(45) Date of Patent: May 3, 2022

(54) NETWORK DEVICE, NETWORK COMMUNICATION SYSTEM, AND NON-TRANSITORY COMPUTER-READABLE STORAGE MEDIUM

(71) Applicant: Ricoh Company, Ltd., Tokyo (JP)

(72) Inventor: Kiwamu Watanabe, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/799,921

(22) Filed: Feb. 25, 2020

(65) Prior Publication Data
US 2020/0295983 A1    Sep. 17, 2020

(30) Foreign Application Priority Data

Mar. 12, 2019  (JP) .............................. JP2019-045204

(51) Int. Cl.
*H04L 12/24* (2006.01)
*H04L 41/069* (2022.01)
*G06F 3/04883* (2022.01)
*G06F 3/0482* (2013.01)
*H04L 41/22* (2022.01)

(52) U.S. Cl.
CPC .......... *H04L 41/069* (2013.01); *G06F 3/0482* (2013.01); *G06F 3/04883* (2013.01); *H04L 41/22* (2013.01)

(58) Field of Classification Search
CPC ... H04L 41/069; H04L 41/22; G06F 3/04883; G06F 3/0482
See application file for complete search history.

(56) References Cited

U.S. PATENT DOCUMENTS

| | | | |
|---|---|---|---|
| 2008/0228937 A1 | 9/2008 | Araumi | |
| 2009/0027726 A1 | 1/2009 | Kajikawa | |
| 2011/0085194 A1* | 4/2011 | Asari | G06F 3/1203 358/1.14 |
| 2011/0295440 A1* | 12/2011 | Noma | H04W 24/00 700/297 |
| 2012/0140273 A1* | 6/2012 | Vorobyev | G06F 3/122 358/1.15 |
| 2013/0145183 A1* | 6/2013 | Wada | G06Q 10/101 713/300 |
| 2017/0353615 A1* | 12/2017 | Hasegawa | G06F 3/1273 |

FOREIGN PATENT DOCUMENTS

| | | |
|---|---|---|
| JP | 2000-137590 | 5/2000 |
| JP | 2002-149380 | 5/2002 |
| JP | 2008-020995 | 1/2008 |
| JP | 2008-071085 | 3/2008 |
| JP | 2009-033555 | 2/2009 |
| JP | 2010-140111 | 6/2010 |

* cited by examiner

*Primary Examiner* — Kim T Nguyen
(74) *Attorney, Agent, or Firm* — Xsensus LLP

(57) ABSTRACT

A network device includes circuitry configured to: generate log information; acquire a status notification from a device that records the log information, the status notification being designated by the device; change a processing mode of the log information, based on the acquired status notification; and transmit, to the device, based on the changed processing mode, the generated log information.

10 Claims, 14 Drawing Sheets

NETWORK DEVICE, NETWORK COMMUNICATION SYSTEM, AND NON-TRANSITORY COMPUTER-READABLE STORAGE MEDIUM

CROSS-REFERENCE TO RELATED APPLICATION

This patent application is based on and claims priority pursuant to 35 U.S.C. § 119(a) to Japanese Patent Application No. 2019-045204, filed on Mar. 12, 2019, in the Japan Patent Office, the entire disclosure of which is hereby incorporated by reference herein.

BACKGROUND

Technical Field

The present disclosure relates to a network device, a network communication system, and a non-transitory computer-readable storage medium.

Description of the Related Art

In recent years, for example, it is useful to record log information of operations or processing in a network device, an image forming apparatus, an information device, or the like. The recorded log information is used, for example, to determine a cause of unauthorized access after finding the record of the unauthorized access, identifying network failures, and the like.

The recorded log information can also be used by a manufacturer of an information processing apparatus to trace the log information later to verify a failure of the information processing apparatus, for example. In addition, the manufacturer can send a record of unauthorized access and load information of the apparatus to a customer to provide useful information to the customer.

To record the log information, for example, it is known to transmit the log information from an information processing apparatus to another processing apparatus, such as a server, to record the log information in the server. In addition, in a known technique, a network device connected closely to an image forming apparatus transfers the log information to the image forming apparatus.

SUMMARY

According to an embodiment, a network device includes circuitry configured to: generate log information; acquire a status notification from a device that records the log information, the status notification being designated by the device; change a processing mode of the log information, based on the acquired status notification; and transmit, to the device, based on the changed processing mode, the generated log information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
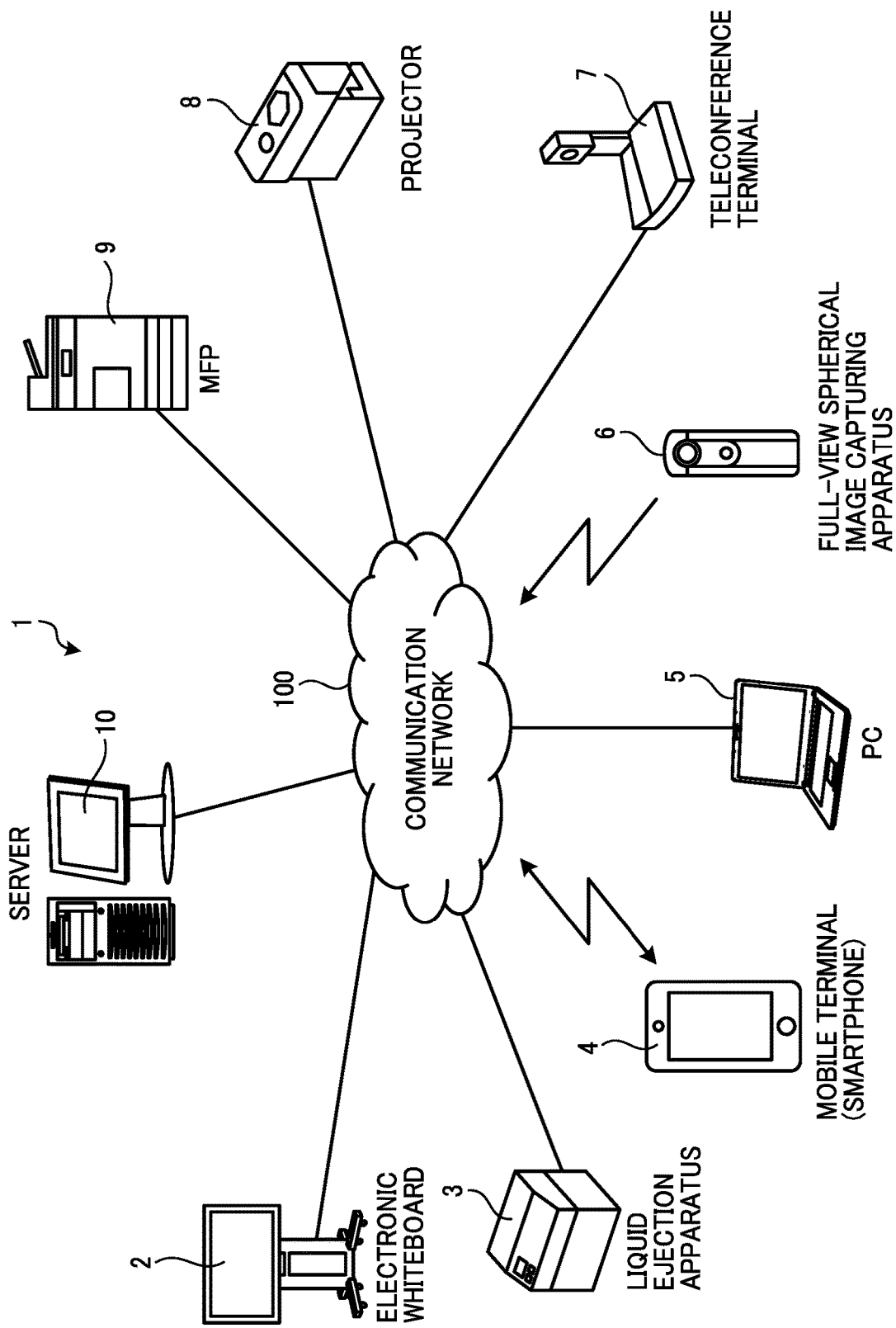
FIG. 1 illustrates a system configuration of a network communication system, according to an embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Now, a network communication system according to an embodiment will be described below with reference to the attached drawings.

System Configuration

FIG. 1 illustrates a system configuration of a network communication system 1 according to the embodiment. As illustrated in FIG. 1, the network communication system 1 according to the embodiment includes an electronic whiteboard 2, a liquid ejection apparatus (inkjet printer apparatus) 3, a mobile terminal 4, such as a smartphone, a personal computer (PC) 5, such as a desktop or laptop personal computer, and a spherical image capturing apparatus 6. The network communication system 1 according to the embodiment further includes a teleconference terminal 7, a projector 8, a multifunction peripheral (MFP) 9, and a server apparatus 10. The MFP 9 is a device having a plurality of image forming functions, such as a copy function and a scanner function. The electronic whiteboard 2, the liquid ejection apparatus 3, the mobile terminal 4, the personal computer 5, the spherical image capturing apparatus 6, the teleconference terminal 7, the projector 8, the MFP 9, and the server apparatus 10 are mutually connected via a predetermined communication network 100, such as a wireless network, a local area network (LAN), or the Internet.

Hardware Configuration of Electronic Whiteboard

Figure 2:
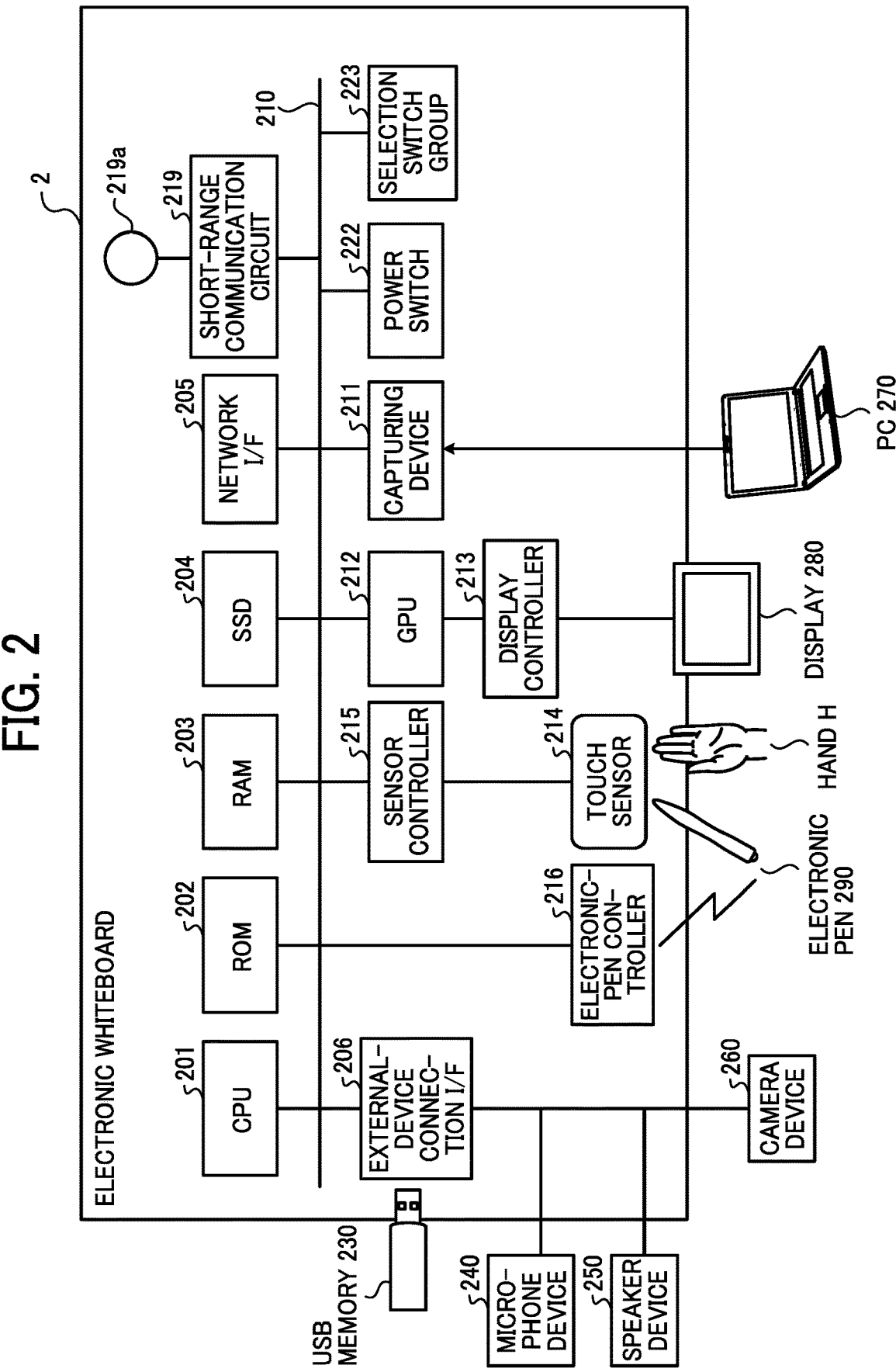
FIG. 2 illustrates a hardware configuration of an electronic whiteboard, according to an embodiment.

FIG. 2 illustrates a hardware configuration of the electronic whiteboard 2. As illustrated in FIG. 2, the electronic whiteboard 2 includes a central processing unit (CPU) 201, a read only memory (ROM) 202, a random access memory (RAM) 203, a solid state drive (SSD) 204, a network interface (I/F) 205, and an external-device connection I/F 206.

The CPU 201 controls the entire operations of the electronic whiteboard 2. The ROM 202 stores a program used for driving the CPU 201, such as an initial program loader (IPL). The RAM 203 is used as a work area for the CPU 201. The SSD 204 stores various kinds of data, such as a program for electronic whiteboard.

The network I/F 205 controls communication with the communication network 100. The external-device connection I/F 206 is an interface for connecting various types of external devices. Examples of the external devices in this case include a universal serial bus (USB) memory 230 and externally attached devices (a microphone device 240, a speaker device 250, and a camera device 260).

The electronic whiteboard 2 further includes a capturing device 211, a graphics processing unit (GPU) 212, a display controller 213, a touch sensor 214, a sensor controller 215, an electronic-pen controller 216, a short-range communication circuit 219, an antenna 219a for the short-range communication circuit 219, a power switch 222, and a selection switch group 223.

The capturing device 211 displays a still image or a moving image on a display of a PC 270 that is externally connected. The GPU 212 is a semiconductor chip dedicated to graphics. The display controller 213 controls and manages display of a screen in order to output an output image from the GPU 212 to a display 280 or the like.

The touch sensor 214 detects a touch operation on the display 280 performed by an electronic pen 290, a user's hand H, or the like. The sensor controller 215 controls processing of the touch sensor 214. The touch sensor 214 detects input coordinates by an infrared ray interruption method. To detect the input coordinates, light-emitting elements of two light-receiving-and-emitting apparatuses provided on both upper side ends of the display 280 emit a plurality of infrared rays in parallel to the display 280. The light-emitting elements of two light-receiving-and-emitting apparatuses receive light that is reflected by a reflection member provided around the display 280 and that returns to the same light path as the light path of light emitted by the light-emitting elements (infrared ray interruption method).

The touch sensor 214 supplies the sensor controller 215 with infrared-ray identification numbers (infrared-ray IDs) of infrared rays emitted by two light-receiving-and-emitting apparatuses and interrupted by an object such as the electronic pen 290 or the user's hand H. On the basis of the supplied infrared-ray IDs, the sensor controller 215 determines the coordinates at which the object has been touched. The electronic-pen controller 216 determines whether a front end or a rear end of the electronic pen 290 touches the display 280 by communicating with the electronic pen 290.

The short-range communication circuit 219 is a communication circuit for near field communication (NFC), Bluetooth (registered trademark), or the like. The power switch 222 is a switch for turning on/off the power of the electronic whiteboard 2. The selection switch group 223 is a group of switches for adjusting the brightness, color, or the like of the display 280, for example. The electronic whiteboard 2 further includes a bus line 210. The bus line 210 is an address bus line, a data bus line, or the like for electrically connecting the components such as the CPU 201 illustrated in FIG. 2.

Note that the touch sensor 214 is not limited to the touch sensor of an infrared ray interruption type and may be a touch sensor of various detection methods, such as a capacitive type in which the touch position is determined by detecting a change in capacitance, a resistive film type in which the touch position is determined by detecting a change in voltage of two facing resistive films, and an electromagnetic induction type in which the touch position is determined by detecting electromagnetic induction generated by a touch of an object on a display. In addition, the electronic-pen controller 216 may determine whether, not only the front end or rear end of the electronic pen 290, but also a portion of the electronic pen 290 where the user grips or another portion of the electronic pen 290 is touched.

Hardware Configuration of Liquid Ejection Apparatus

Figure 3:
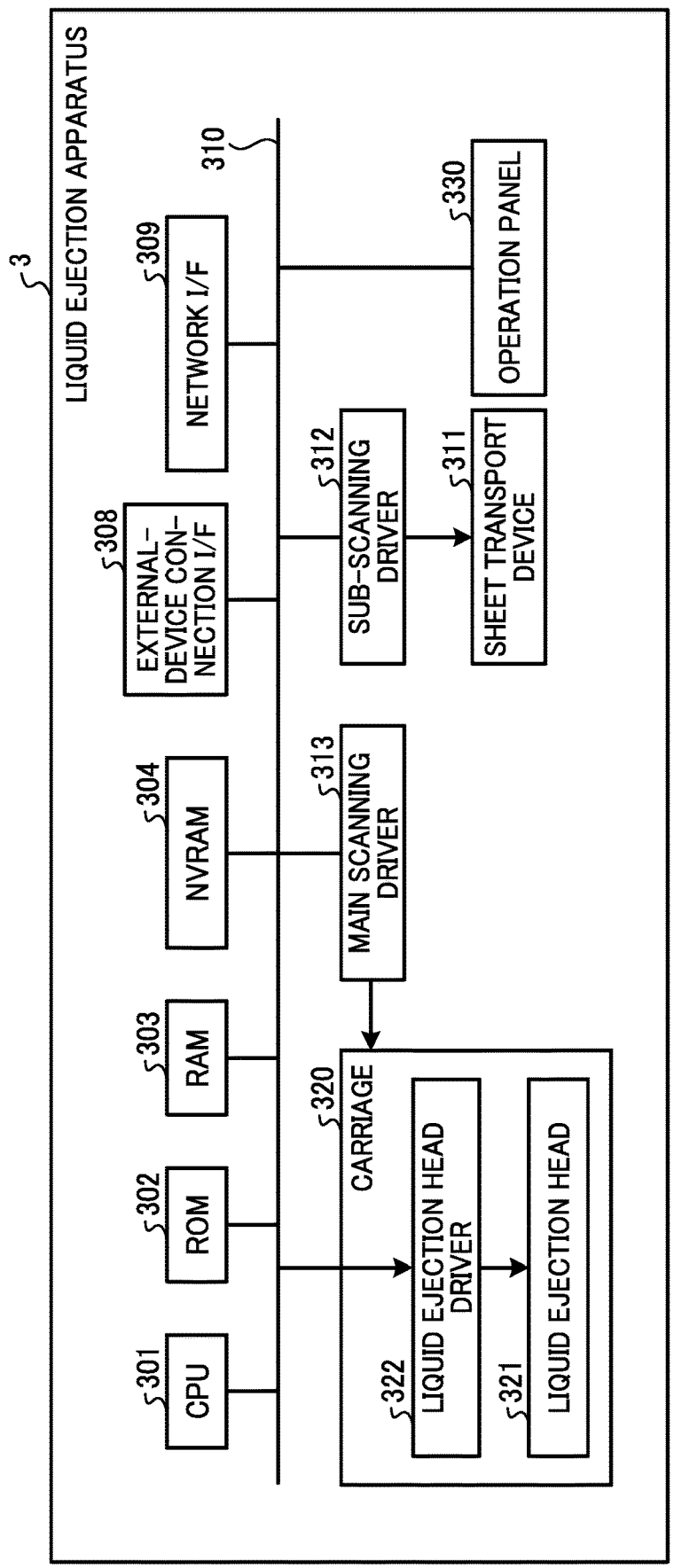
FIG. 3 illustrates a hardware configuration of a liquid ejection apparatus (inkjet printer apparatus), according to an embodiment.

FIG. 3 illustrates a hardware configuration of the liquid ejection apparatus (inkjet printer apparatus) 3. As illustrated in FIG. 3, the liquid ejection apparatus 3 includes a CPU 301, a ROM 302, a RAM 303, a non-volatile random access memory (NVRAM) 304, an external-device connection I/F 308, a network I/F 309, and a bus line 310. The liquid ejection apparatus 3 further includes a sheet transport device 311, a sub-scanning driver 312, a main scanning driver 313, a carriage 320, and an operation panel 330. In addition, the carriage 320 includes a liquid ejection head 321 and a liquid ejection head driver 322.

The CPU 301 controls the entire operations of the liquid ejection apparatus 3. The ROM 302 stores a program used for driving the CPU 301, such as an IPL, and the like. The RAM 303 is used as a work area for the CPU 301. The NVRAM 304 stores various kinds of data, such as a program, and holds various kinds of data while the power of the liquid ejection apparatus 3 is off. The external-device connection I/F 308 is connected to a PC by a USB cable or the like and transmits and receives control signals and print data to and from the PC. The network I/F 309 is an interface for data communication via the communication network 100, such as the Internet. The bus line 310 is an address bus line, a data bus line, or the like for electrically connecting the components such as the CPU 301.

The sheet transport device 311 is, for example, a roller and a motor that drives a roller and transports a print sheet in a sub-scanning direction in a transport path within the liquid ejection apparatus 3. The sub-scanning driver 312 controls movement of the sheet transport device 311 in the sub-scanning direction. The main scanning driver 313 controls movement of the carriage 320 in a main scanning direction.

The liquid ejection head 321 of the carriage 320 includes a plurality of nozzles for ejecting liquid such as ink. The ejecting surface (nozzle surface) is provided in the carriage 320 so as to face the print sheet. The liquid ejection head 321 ejects liquid onto a print sheet that is intermittently transported in the sub-scanning direction while moving in the main scanning direction so as to form an image by ejecting liquid at predetermined positions on the print sheet. The liquid ejection head driver 322 is a driver for controlling driving of the liquid ejection head 321. The operation panel 330 includes a touch panel, an alarm lamp, and the like, displays a current setting value, a selection screen, and the like, and accepts input from an operator.

Note that the liquid ejection head driver 322 may be provided so as to be connected to the bus line 310 from outside of the carriage 320. In addition, the main scanning driver 313, the sub-scanning driver 312, and the liquid ejection head driver 322 may each be a software function implemented by the CPU 301 executing a corresponding program.

Hardware Configuration of Mobile Terminal

Figure 4:
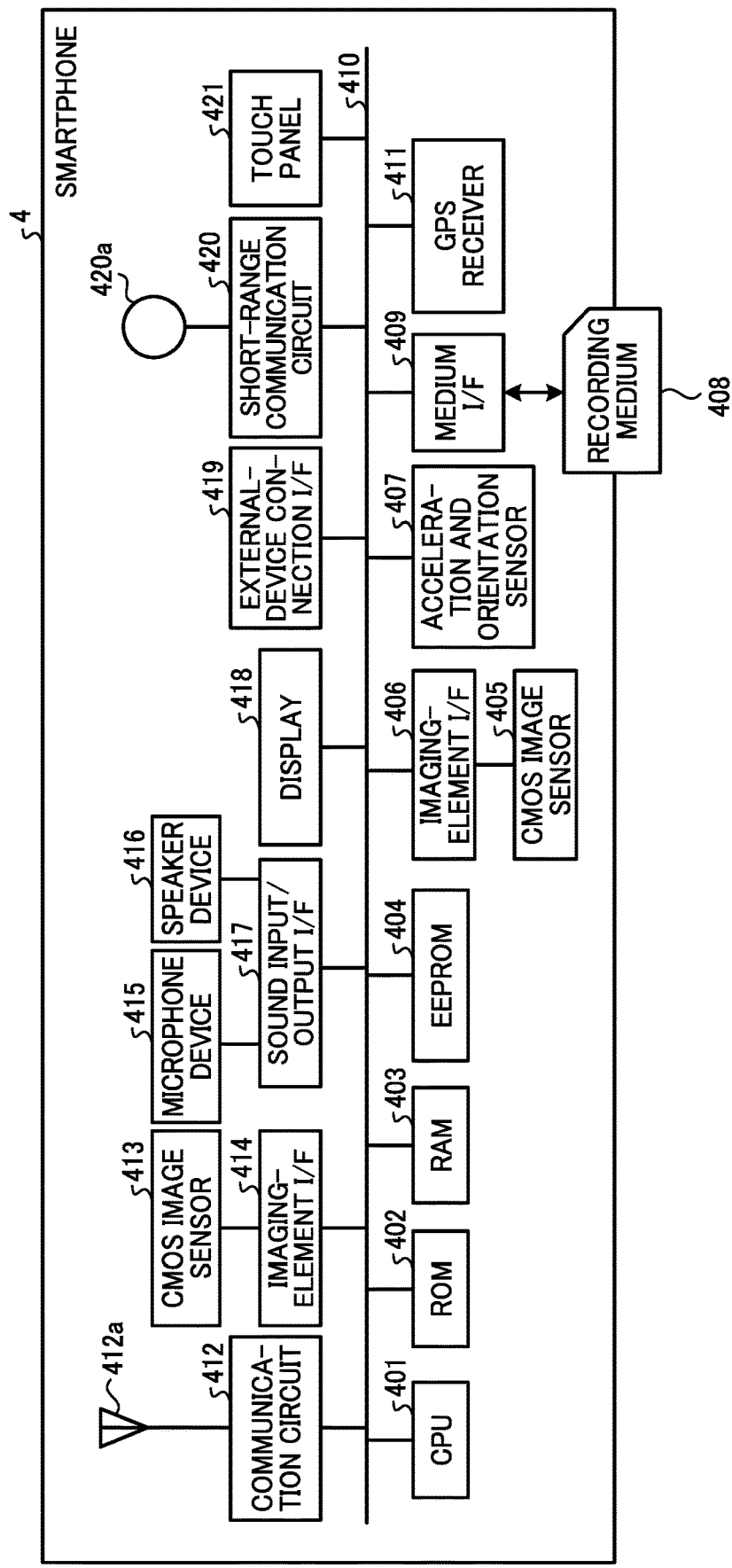
FIG. 4 illustrates a hardware configuration of a mobile terminal, according to an embodiment.

FIG. 4 illustrates a hardware configuration of the mobile terminal 4, such as a smartphone. As illustrated in FIG. 4, the mobile terminal 4 includes a CPU 401, a ROM 402, a RAM 403, an electrically erasable, programmable read only memory (EEPROM) 404, a complementary metal oxide semiconductor (CMOS) image sensor 405, an imaging-element I/F 406, an acceleration and orientation sensor 407, a medium IX 409, a global positioning system (GPS) receiver 411.

The CPU 401 controls the entire operations of the mobile terminal 4. The ROM 402 stores a program used for driving the CPU 401, such as an IPL. The RAM 403 is used as a work area for the CPU 401. The EEPROM 404 reads or writes various kinds of data, such as a program for the mobile terminal, under control of the CPU 401. The CMOS image sensor 405 generates image data corresponding to imaging light from a subject under control of the CPU 401. Note that instead of the CMOS image sensor, for example, another imaging device, such as a charge coupled device (CCD) image sensor, may also be used.

The imaging-element I/F 406 is an interface for connecting the CMOS image sensor 405 to a bus line 410. The acceleration and orientation sensor 407 is a sensor, such as an electromagnetic compass for detecting geomagnetism, a gyrocompass, or an acceleration sensor. The medium I/F 409 is an interface for connecting, for example, a recording medium 408, such as a flash memory, to the bus line 410. Data is written to and read from the recording medium 408 through the medium I/F 409. The GPS receiver 411 receives a GPS signal from a GPS satellite.

The mobile terminal 4 further includes a long-range communication circuit 412, a CMOS image sensor 413, an imaging-element I/F 414, a microphone device 415, a speaker device 416, a sound input/output I/F 417, a display 418, an external-device connection I/F 419, a short-range communication circuit 420, an antenna 420a for the short-range communication circuit 420, and a touch panel 421.

The long-range communication circuit 412 communicates with another apparatus via the communication network 100. The CMOS image sensor 413 images a subject under control of the CPU 401 to generate image data. The imaging-element I/F 414 is an interface for connecting the CMOS image sensor 413 to the bus line 410. The microphone device 415 generates a sound signal, which is an electric signal, corresponding to collected sounds. The speaker device 416 outputs acoustic data, such as music or sound corresponding to the sound signal. The sound input/output I/F 417 controls input/output of a sound signal to/from the microphone device 415 and the speaker device 416 under control of the CPU 401.

The display 418, such as a liquid crystal display or an organic electroluminescent (EL) display, displays a subject image, various icons, and the like. The external-device connection I/F 419 is an interface for connecting various external devices. The short-range communication circuit 420 is a communication circuit for NFC, Bluetooth (registered trademark), or the like. The touch panel 421 is provided on the display 418 and detects a touch operation of a user.

The mobile terminal 4 further includes the bus line 410. The bus line 410 is an address bus line, a data bus line, or the like for electrically connecting the components such as the CPU 401 illustrated in FIG. 4.

Hardware Configuration of Server

Figure 5:
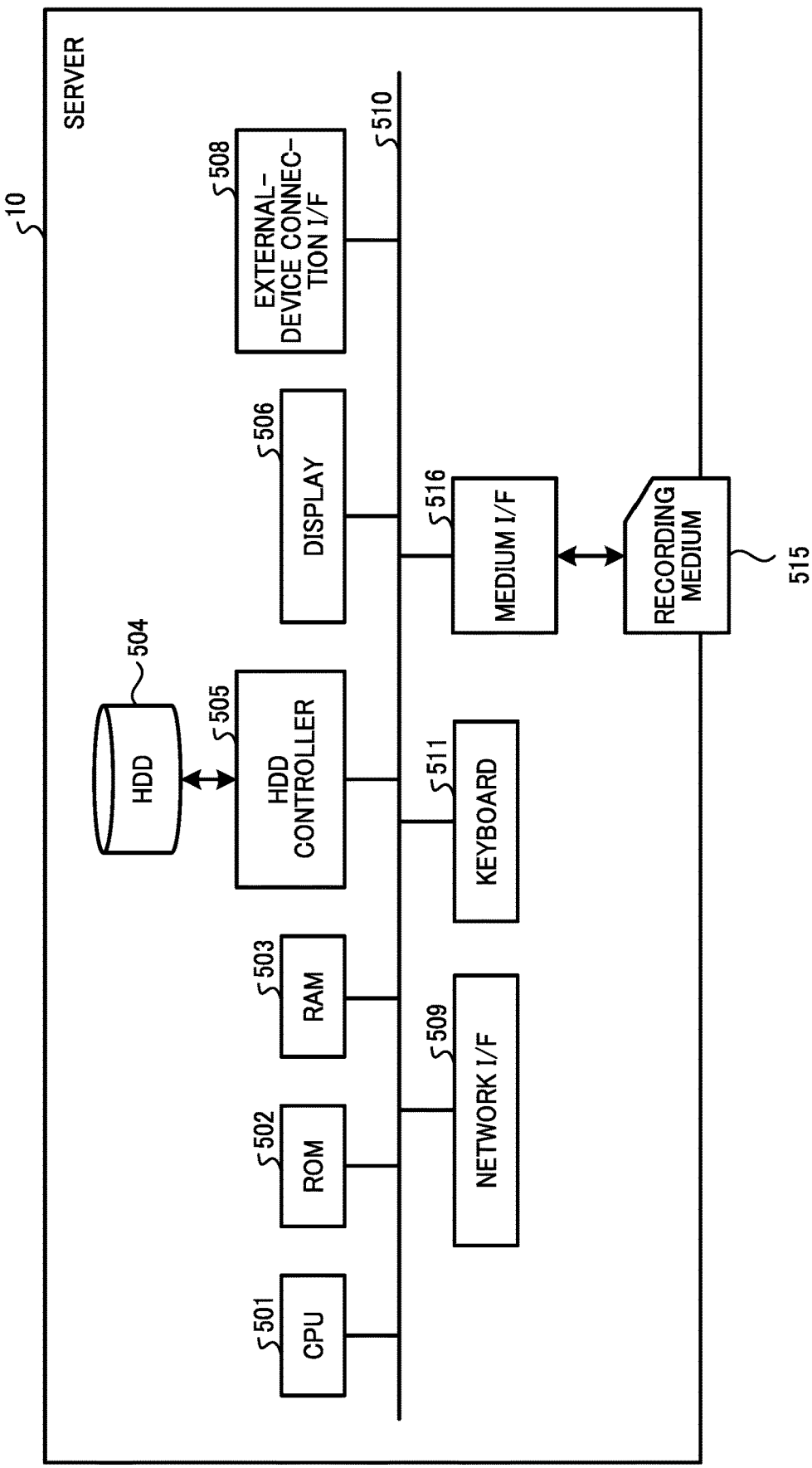
FIG. 5 illustrates a hardware configuration of a server, according to an embodiment.

FIG. 5 illustrates a hardware configuration of the server apparatus 10. Note that the hardware configuration of the personal computer 5 is substantially the same as the hardware configuration of the server apparatus 10. Thus, for the hardware configuration of the personal computer 5, the following description of the hardware configuration of the server apparatus 10 will be referred to.

As illustrated in FIG. 5, the server apparatus 10 has substantially the same configuration as a personal computer. The server apparatus can be configured by a single computer or a plurality of computers. The server apparatus 10 includes a CPU 501, a ROM 502, and a RAM 503. The server apparatus 10 further includes a hard disk drive (HDD) 504, an HDD controller 505, a display 506, an external-device connection I/F 508, a network I/F 509, a bus line 510, a keyboard 511, and a medium I/F 516.

The CPU 501 controls the entire operations of the server apparatus 10. The ROM 502 stores a program used for driving the CPU 501, such as an IPL. The RAM 503 is used as a work area for the CPU 501. The HDD 504 stores various kinds of data, such as a program. The HDD controller 505 controls writing and reading of various kinds of data to and from the HDD 504 under control of the CPU 501. The display 506 displays various kinds of information of a cursor, menu, window, character, image, or the like.

The external-device connection I/F 508 is an interface for connecting various external devices, such as a USB memory or a printer apparatus. The network I/F 509 is an interface for data communication using the communication network 100. The bus line 510 is an address bus line, a data bus line, or the like for electrically connecting the components such as the CPU 501.

Figure 6:
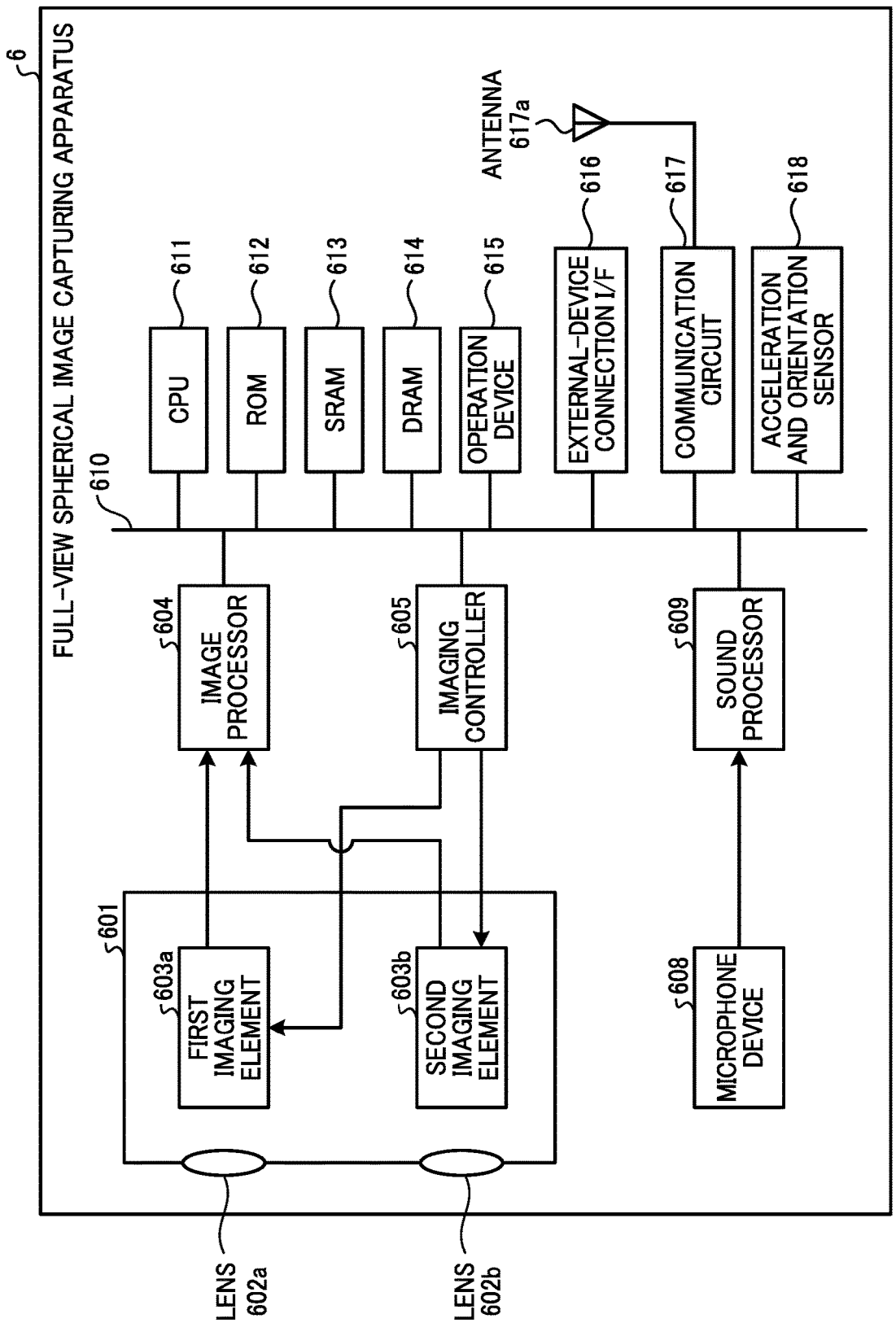
FIG. 6 illustrates a hardware configuration of a spherical image capturing apparatus, according to an embodiment.

The keyboard 511 includes a plurality of keys and enables input of a character, numeral, instruction, and the like. The medium I/F 516 controls writing (storing) or reading of data to or from a recording medium 515, such as a flash memory. The server apparatus Hardware Configuration of Spherical Image Capturing Apparatus Next, FIG. 6 illustrates a hardware configuration of the spherical image capturing apparatus 6. The spherical image capturing apparatus 6 illustrated in FIG. 6 includes, as an example, two imaging elements: a first imaging element 603a and a second imaging element 603b. Although the two imaging elements 603a and 603b are provided in this example in the following description, three or more imaging elements may alternatively be provided. In addition, the spherical image capturing apparatus 6 is not necessarily an image capturing device dedicated to omnidirectional image capturing. Alternatively, an external omnidirectional image capturing unit may be attached to a general-purpose digital camera or a camera unit of a smartphone to implement an image capturing device having substantially the same function as that of the spherical image capturing apparatus 6.

As illustrated in FIG. 6, the spherical image capturing apparatus 6 includes an imaging device 601, an image processor 604, an imaging controller 605, a microphone device 608, a sound processor 609, a CPU 611, a ROM 612, a static random access memory (SRAM) 613, and a dynamic random access memory (DRAM) 614. The spherical image capturing apparatus 6 further includes an operation device 615, an external-device connection I/F 616, a communication circuit 617, an antenna 617a, and an acceleration and orientation sensor 618, such as an electronic compass or a gyro sensor.

The imaging device 601 includes wide-angle lenses (so-called fish-eye lenses) 602a and 602b, each having an angle of view of equal to or greater than 180° so as to form a hemispherical image. The imaging device 601 further includes the first and second imaging elements 603a and 603b corresponding to the wide-angle lenses 602a and 602b, respectively. Each of the imaging elements 603a and 603b is an image sensor, such as a CMOS image sensor and a CCD image sensor, which obtains an optical image through a corresponding one of the wide-angle lenses 602a and 602b and converts the optical image into electric signals to output image data. Each of the imaging elements 603a and 603b includes a timing generation circuit, a group of registers, and the like. The timing generation circuit generates horizontal or vertical synchronization signals, pixel clocks, and the like. Various commands, parameters, and the like for operations of the imaging elements 603a and 603b are set in the group of registers.

Each of the imaging elements 603a and 603b of the imaging device 601 is connected to the image processor 604 via a parallel I/F bus line whereas each of the imaging elements 603a and 603b of the imaging device 601 is connected to the imaging controller 605 via a serial I/F bus line (e.g., inter integrated circuit (I2C) bus line).

The image processor 604, the imaging controller 605, and the sound processor 609 are connected to the CPU 611 via a bus line 610. The ROM 612, the SRAM 613, the DRAM 614, the operation device 615, the external-device connection I/F 616, the communication circuit 617, the acceleration and orientation sensor 618, and the like are also connected to the bus line 610.

The image processor 604 obtains image data output from each of the imaging elements 603a and 603b via the parallel I/F bus line and performs predetermined processing on the image data. Subsequently, the image processor 604 combines these image data items to generate data of an equirectangular projection image.

The imaging controller 605 operates as a master device and sets a command or the like obtained from the CPU 611 to the group of registers of the imaging elements 603a and 603b, which are slave devices, via the I2C bus line. In addition, the imaging controller 605 obtains, for example, status data of the group of registers of the imaging elements 603a and 603b via the I2C bus line and transfers the data to the CPU 611.

In addition, in response to an operation on a shutter button of the operation device 615, the imaging controller 605 instructs the imaging elements 603a and 603b to output image data. The spherical image capturing apparatus 6 may have a function for displaying a preview or a function for displaying a video by using a display of a smartphone, for example. In this case, the imaging elements 603a and 603b output image data continuously at a predetermined frame rate (frame/minute).

The imaging controller 605 further controls synchronization of timing for outputting image data from the imaging elements 603a and 603b together with the CPU 611. Note that the spherical image capturing apparatus 6 may be provided with a display.

The microphone device 608 converts collected sounds into sound data. The sound processor 609 obtains the sound data output from the microphone device 608 via the I/F bus line and performs predetermined processing on the sound data.

The CPU 611 controls the entire operations of the spherical image capturing apparatus 6 and performs processing. The ROM 612 stores various programs for the CPU 611. The SRAM 613 and the DRAM 614 are work memory and store programs to be executed by the CPU 611, data being processed by the CPU 611, and the like. In particular, the DRAM 614 stores image data being processed by the image processor 604 and equirectangular projection image data processed by the image processor 604.

The operation device 615 includes operation buttons such as a shutter button. By operating the operation device 615, a user inputs various imaging modes, imaging conditions, and the like. The external-device connection I/F 616 is an interface for connecting an external device such as a USB memory or a PC. A recording device is connected through the external-device connection I/F 616 and records, on a medium, the equirectangular projection image data stored in the DRAM 614. In addition, the equirectangular projection image data stored in the DRAM 614 is transmitted to an external terminal, such as a smartphone, by the communication circuit 617 as necessary.

The communication circuit 617 performs short-range wireless communication, such as Wi-Fi, NFC, or Bluetooth (registered trademark), via the antenna 617a provided in the spherical image capturing apparatus 6.

The acceleration and orientation sensor 618 calculates the orientation of the spherical image capturing apparatus 6 from the Earth's magnetism to output orientation information. The orientation information is an example of related information (meta data) in compliance with the exchangeable image file format (Exif), which is a format for storing an image, and is used for image processing of a captured image, such as correction. Note that the related information also includes the date and time when the image was captured and data capacity of the image.

In addition, the acceleration and orientation sensor 618 detects a change in angles (roll, pitch, yaw) in accordance with movement of the spherical image capturing apparatus 6. The change in angles is an example of the related information (meta data) in compliance with Exif and is used for image processing of a captured image, such as correction. The acceleration and orientation sensor 618 further detects acceleration in three axial directions. On the basis of the acceleration detected by the acceleration and orientation sensor 618, the spherical image capturing apparatus 6 calculates the orientation (angle with respect to the gravity direction) of the spherical image capturing apparatus 6. The acceleration and orientation sensor 618 provided in the spherical image capturing apparatus 6 can increase the accuracy in image correction.

Hardware Configuration of Teleconference Terminal

Figure 7:
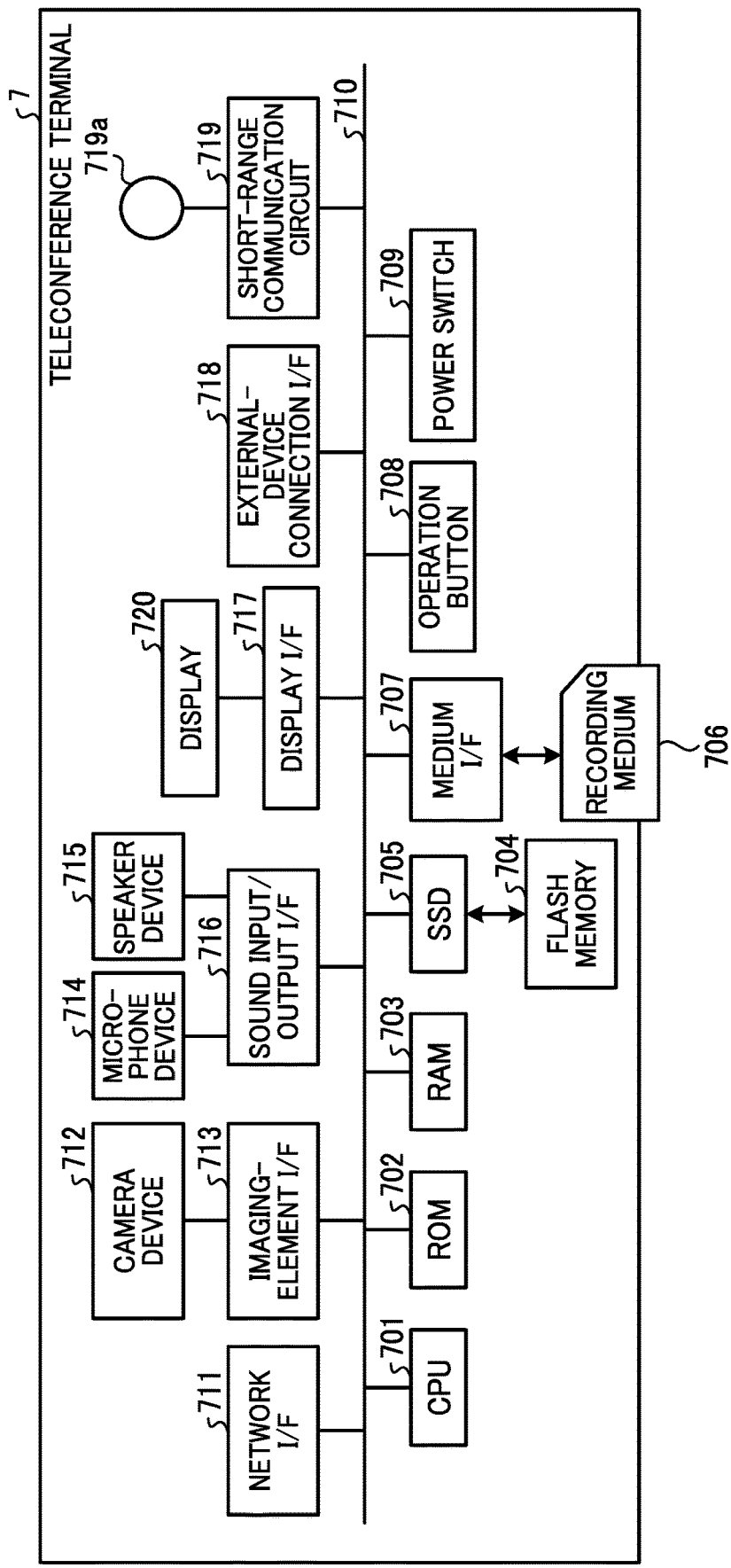
FIG. 7 illustrates a hardware configuration of a teleconference terminal, according to an embodiment.

FIG. 7 illustrates a hardware configuration of the teleconference terminal 7. As illustrated in FIG. 7, the teleconference terminal 7 includes a CPU 701, a ROM 702, a RAM 703, a flash memory 704, an SSD 705, a medium I/F 707, an operation button 708, a power switch 709, and a bus line 710. The teleconference terminal 7 further includes a network I/F 711, a camera device (e.g., CMOS image sensor) 712, an imaging-element I/F 713, a microphone device 714, a speaker device 715, a sound input/output I/F 716, a display I/F 717, an external-device connection I/F 718, a short-range communication circuit 719, and an antenna 719a for the short-range communication circuit 719.

The CPU 701 controls the entire operations of the teleconference terminal 7. The ROM 702 stores a program used for driving the CPU 701, such as an IPL. The RAM 703 is used as a work area for the CPU 701. The flash memory 704 stores various kinds of data, such as a communication program, image data, and sound data. The SSD 705 controls reading and writing of various kinds of data from and to the flash memory 704 under control of the CPU 701. Note that an HDD may be used instead of the SSD 705.

The medium I/F 707 controls writing and reading of data to and from a recording medium 706, such as a flash memory. The operation button 708 is a button operated when an address of the teleconference terminal 7 is selected, for example. The power switch 709 is a switch for turning on/off the power of the teleconference terminal 7.

The network I/F 711 is an interface for data communication via the communication network 100, such as the Internet. The camera device 712 is a CMOS image sensor, a CCD image sensor, or the like and images a subject under control of the CPU 701 to generate image data. The imaging-element I/F 713 is an interface for connecting the camera device 712 to the bus line 710.

The microphone device 714 converts collected sounds into a sound signal, which is an electric signal. The speaker device 715 outputs sound corresponding to a sound signal, which is an electric signal. The sound input/output I/F 716 controls input/output of sound signals to/from the microphone device 714 and the speaker device 715 under control of the CPU 701. The display I/F 717 transmits image data to an external display under control of the CPU 701. The external-device connection I/F 718 is an interface for connecting various external devices. The short-range communication circuit 719 is a communication circuit for NFC, Bluetooth (registered trademark), or the like. The bus line 710 is an address bus line, a data bus line, or the like for electrically connecting the components such as the CPU 701 illustrated in FIG. 7.

A display 720 is configured by, for example, a liquid crystal display, an organic EL display, or the like and displays a subject image, operation icons, and the like. In addition, the display 720 is connected to the display I/F 717 via a connection cable. The connection cable may be a cable for analog R (red) G (green) B (blue) signals (cable for video graphics array (VGA)). Alternatively, the connection cable may be a cable for component video or a cable for high-definition multimedia interface (HDMI, registered trademark) or digital video interactive (DVI) signals.

Note that the camera device 712 images a subject under control of the CPU 701 to generate image data. The camera device 712 may be a CMOS image sensor or a CCD image sensor, for example. To the external-device connection I/F 718, external devices such as an external camera, an external microphone, and an external speaker can be connected via a USB cable or the like. For example, if an external camera is connected, control and driving of the external camera precede control and driving of the built-in camera device 712 under control of the CPU 701. Similarly, if an external microphone is connected or if an external speaker is connected, control and driving of the external microphone or the external speaker precede control and driving of the built-in microphone device 714 or speaker device 715 under control of the CPU 701.

The recording medium 706 is detachably attached to the teleconference terminal 7. The recording medium 706 may be a non-volatile memory, such as the flash memory 704 or an EEPROM, to and from which data can be written and read under control of the CPU 701.

Hardware Configuration of Projector

Figure 8:
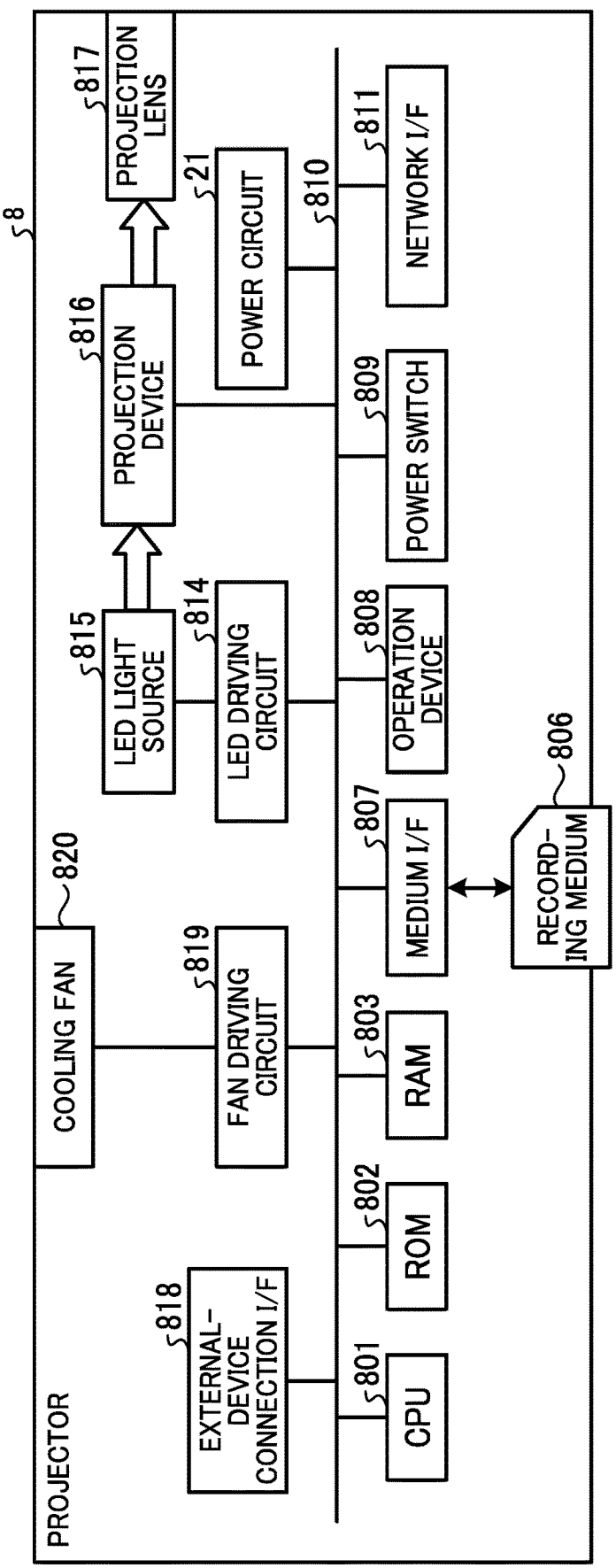
FIG. 8 illustrates a hardware configuration of a projector, according to an embodiment.

FIG. 8 illustrates a hardware configuration of the projector 8. As illustrated in FIG. 8, the projector 8 includes a CPU 801, a ROM 802, a RAM 803, a medium I/F 807, an operation device 808, a power switch 809, a bus line 810, and a network I/F 811. The projector 8 further includes a light emitting diode (LED) driving circuit 814, an LED light source 815, a projection device 816, a projection lens 817, an external-device connection I/F 818, a fan driving circuit 819, and a cooling fan 820.

The CPU 801 controls the entire operations of the projector 8. The ROM 802 stores a program used for driving the CPU 801. The RAM 803 is used as a work area for the CPU 801. The medium I/F 807 connects a recording medium 806, such as a flash memory, to the bus line 810. This enables writing and reading of data to and from the recording medium 806.

The operation device 808 is provided with various keys, buttons, LEDs, and the like and is used by a user to perform various operations other than turning on/off the power of the projector 8. For example, in response to an instruction operation, such as an operation for adjusting the size of a projection image, an operation for adjusting color, an operation for adjusting the focus, or an operation for adjusting keystone, the operation device 808 outputs the operation content to the CPU 801. The power switch 809 is a switch for turning on or off the power of the projector 8.

The bus line 810 is an address bus line, a data bus line, or the like for electrically connecting the components such as the CPU 801. The network I/F 811 is an interface for data communication via the communication network 100, such as the Internet. The LED driving circuit 814 controls turning on/off the LED light source 815 under control of the CPU 801. Upon being turned on under control of the LED driving circuit 814, the LED light source 815 emits projection light onto the projection device 816.

On the basis of image data provided via the external-device connection I/F 818 or the like, the projection device 816 obtains modulated light of projection light from the LED light source 815 by a special light modulation method and projects the modulated light onto a projection face of a screen through the projection lens 817 as an image. The projection device 816 may be, for example, a liquid crystal panel, a digital micromirror device (DMD), or the like. The set of the LED driving circuit 814, the LED light source 815, the projection device 816, and the projection lens 817 functions as a projection unit that projects a projection image onto a projection surface on the basis of image data.

The external-device connection I/F 818 is directly connected to a PC and obtains a control signal and image data from the PC. The fan driving circuit 819 is connected to the CPU 801 and the cooling fan 820 and, on the basis of a control signal from the CPU 801, drives or stops driving of the cooling fan 820. The cooling fan 820 rotates to discharge air from the projector 8 and cool the inside of the projector 8.

In addition, in response to power being supplied, the CPU 801 operates in accordance with a control program that is stored in advance in the ROM 802 and supplies a control signal to the LED driving circuit 814 to turn on the LED light source 815. Furthermore, the CPU 801 supplies a control signal to the fan driving circuit 819 to rotate the cooling fan 820 at a predetermined rated rotational speed. In addition, in the projector 8, upon power being supplied from a power source circuit 21, the projection device 816 can display an image, and power is further supplied from the power source circuit 21 to other various components.

When the power switch 809 of the projector 8 is turned off, a power-off signal is supplied from the power switch 809 to the CPU 801. Upon detecting the power-off signal, the CPU 801 supplies a control signal to the LED driving circuit 814 to turn off the LED light source 815. Then, when a predetermined time elapses, the CPU 801 controls the fan driving circuit 819 to stop the cooling fan 820 and also controls the power source circuit 21 to stop supplying power.

Hardware Configuration of MFP

Figure 9:
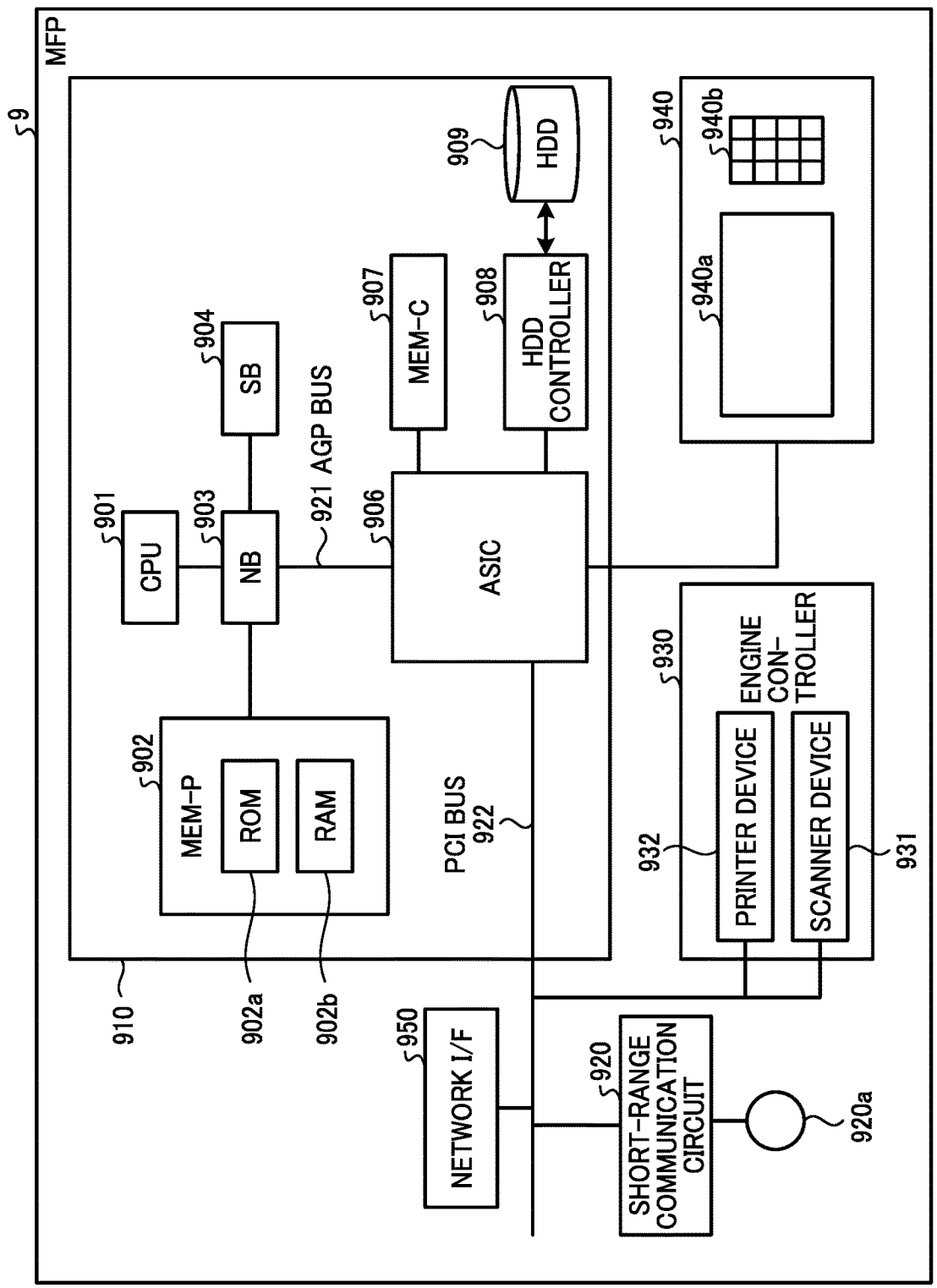
FIG. 9 illustrates a hardware configuration of a multifunctional peripheral (MFP), according to an embodiment.

FIG. 9 illustrates a hardware configuration of the MFP 9. As illustrated in FIG. 9, the MFP 9 includes a controller 910, a short-range communication circuit 920, an engine controller 930, an operation panel 940, and a network I/F 950.

The controller 910 includes a CPU 901, a system memory (MEM-P) 902, a northbridge (NB) 903, a southbridge (SB) 904, an application specific integrated circuit (ASIC) 906, a local memory (MEM-C) 907, an HDD controller 908, and an HDD 909. The NB 903 and the ASIC 906 are connected to each other via an Accelerated Graphics Port (AGP) bus 921.

The CPU 901 is a controller that entirely controls the MFP 9. The NB 903 is a bridge for connecting the CPU 901, the MEM-P 902, the SB 904, and the AGP bus 921. The NB 903 includes a memory controller that controls reading from and writing to the MEM-P 902, a Peripheral Component Interconnect (PCI) master, and an AGP target.

The MEM-P 902 includes a ROM 902a and a RAM 902b. The ROM 902a is a memory for storing a program or data that implements the functions of the memory controller. The RAM 902b is used as a memory for loading the program or data, a rendering memory at the time of memory printing, or the like. Note that the program stored in the RAM 902b may be recorded on a non-transitory computer-readable storage medium, such as a compact disc-read only memory (CD-ROM), a compact disc-recordable (CD-R), or a digital versatile disk (DVD), as a file of an installable format or an executable format and be provided.

The SB 904 is a bridge for connecting the NB 903 to a PCI device or a peripheral device. The ASIC 906 is an IC for image processing including hardware components for image processing and serves as a bridge for connecting the AGP bus 921, a PCI bus 922, the HDD controller 908, and the MEM-C 907 to one another.

The ASIC 906 includes a memory controller that controls a PCI target, an AGP master, an arbiter (ARB) serving as a central processor of the ASIC 906, and the MEM-C 907. In addition, the ASIC 906 includes a plurality of direct memory access controllers (DMACs) that, for example, rotate an image by a hardware logic or the like, and a PCI device that transfers data from and to a scanner device 931 and a printer device 932 via the PCI bus 922. Note that the ASIC 906 may be connected to a USB interface or an interface of Institute of Electrical and Electronics Engineers 1394 (IEEE 1394).

The MEM-C 907 is a local memory used as an image buffer for copying and a code buffer. The HDD 909 is a memory for storing image data, font data to be used at the time of printing, and forms. The HDD controller 908 controls writing of data to and reading of data from the HDD 909 under control of the CPU 901. The AGP bus 921 is a bus interface for a graphics accelerator card proposed for high-speed graphics processing. The AGP bus 921 can directly access the MEM-P 902 with high throughput for higher speed processing of the graphics accelerator card.

The short-range communication circuit 920 includes an antenna 920a. The short-range communication circuit 920 is a communication circuit for NFC, Bluetooth (registered trademark), or the like. In addition, the engine controller 930 includes the scanner device 931 and the printer device 932.

The operation panel 940 includes a panel display 940a, such as a touch panel, which displays current setting values, a selection screen, and the like and which receives input from an operator. The operation panel 940 further includes a key operation unit 940b including a numeric keypad for setting values of conditions related to image formation, such as density setting conditions, a start key for a copy start instruction, and the like.

The controller 910 entirely controls the MFP 9 and for example, controls rendering, controls communication, and processes data input on the operation panel 940. The scanner device 931 or the printer device 932 have image processing functions, such as error diffusion and gamma conversion.

With an application switching key of the operation panel 940, the MFP 9 can sequentially switch between a document box function, a copy function, a printer function, and a fax function. When the document box function is selected, the MFP 9 enters a document box mode. When the copy function is selected, the MFP 9 enters a copy mode. When the printer function is selected, the MFP 9 enters a printer mode. When the fax function is selected, the MFP 9 enters a fax mode.

The network I/F 950 is an interface for data communication via the communication network 100. The short-range communication circuit 920 and the network I/F 950 are electrically connected to the ASIC 906 via the PCI bus 922.

Network Connection Configuration

In the network communication system 1 according to the embodiment, the network device transmits log information to an image processing apparatus (or an information processing apparatus), and the image processing apparatus records (stores) the log information. In this case, the image processing apparatus sends a status notification of the image processing apparatus to the network device, such as a notification of a processing mode or a notification of a size (capacity) of a memory area for storing the log information of the image processing apparatus. In accordance with the status of the image processing apparatus, the network device changes a detail level or transmission frequency of the log information. Thus, it is possible to obtain the log information from the network device in the processing mode designated by the image processing apparatus and to prevent the drawback that unnecessary log information is stored or transferred.

Figure 10:
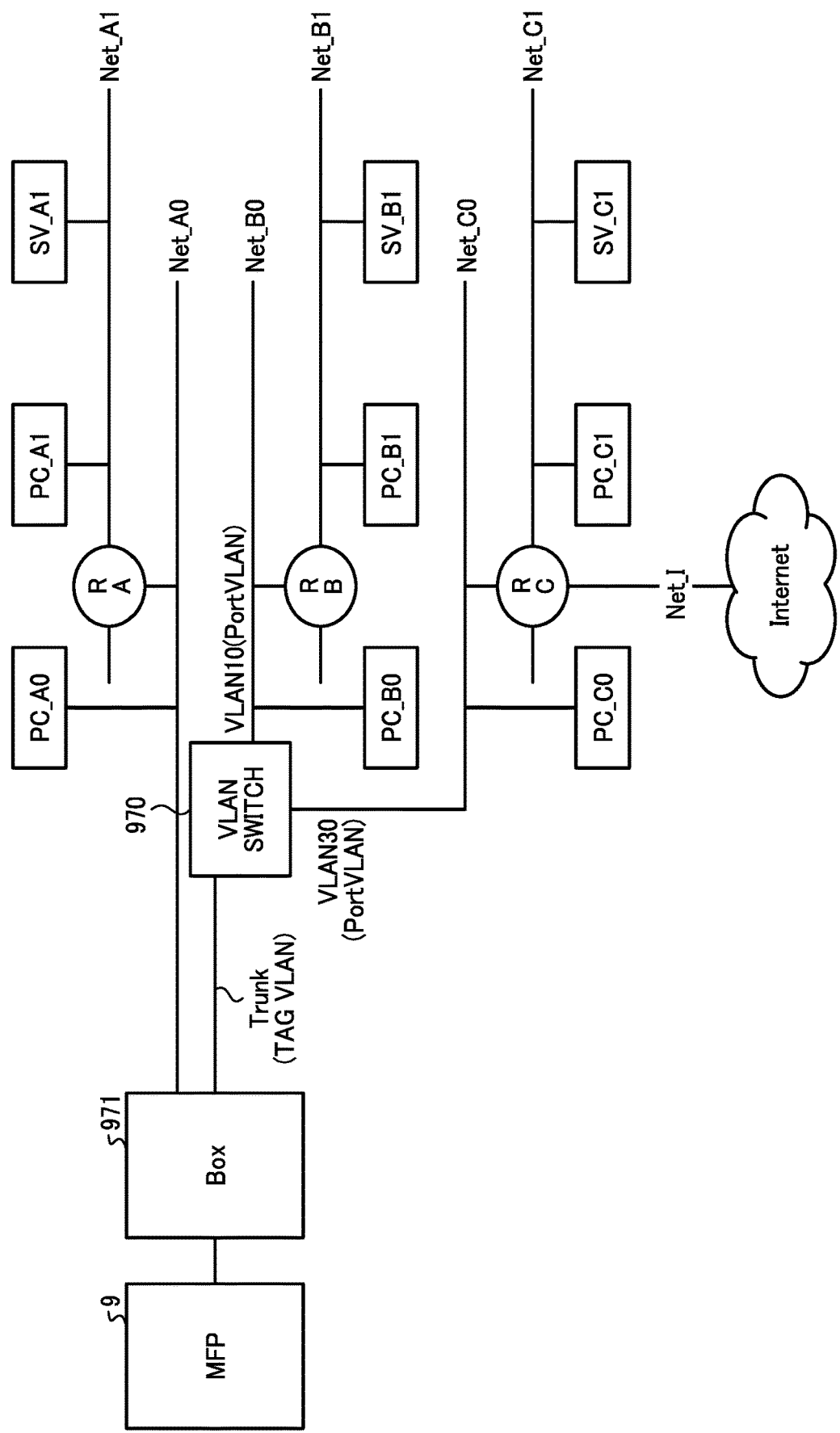
FIG. 10 illustrates a network connection configuration of the MFP, according to an embodiment.

For example, FIG. 10 illustrates a network connection configuration of the MFP 9 in the network communication system 1 according to the embodiment. On the assumption that a router is provided in each of a plurality of networks that are isolated so that communication therebetween is not performed, the network communication system 1 according to the embodiment also controls a channel to a network other than a directly connected network. This makes it possible to perform communication between the plurality of networks via the routers, and the image processing apparatus such as the MFP 9 can be used in a large-scale network.

Network Connection Configuration

That is, in FIG. 10, the MFP 9 (an example of the image processing apparatus) is connected to a network Net_A0 via a communication control box 971 (an example of the network device). The MFP 9 is further connected to a network Net_B0 and a network Net_C0 via the communication control box 971 and a virtual local area network (VLAN) switch 970. A network interface of the MFP 9 has a media access control (MAC) address "00-00-5E-00-53-22".

The networks Net_A0, Net_B0, and Net_C0 are respectively connected to networks Net_A1, Net_B1, and Net_C1 via routers R_A, R_B, and R_C. In addition, a network Net_I is connected to the networks Net_C0 and Net_C1 via the router R_C. Furthermore, the networks Net_C0 and Net_C1 are connected to the Internet via the router R_C and the network Net_I. Note that in this example, networks Net_A0, Net_A1, Net_B0, and Net_B1 are unable to be connected to the Internet considering the communication security. However, the networks Net_A0, Net_A1, Net_B0, and Net_B1 may also be able to be connected to the Internet.

In addition, the networks Net_B0 and Net_C0 are each connected to the VLAN switch 970. Ports of the VLAN switch 970 correspond to VLAN 10 and VLAN 30 as an example. A trunk port of the VLAN switch 970 is connected to the communication control box 971.

In this example, the networks connected to the MFP 9 are divided into a network system Net_A, in which the networks Net_A0 and Net_A1 are set as a group; a network system Net_B, in which the networks Net_B0 and Net_B1 are set as a group; and a network system Net_C, in which the networks Net_C0, Net_C1, and Net_I are set as a group. Each of the network systems are isolated so that Internet protocol (IP) communication is not possible. Note that this example will be described on the assumption that IP communication is not possible between the network systems. However, communication may be performed between the network systems depending on security requirements or the like.

The networks Net_A0, Net_B0, and Net_C0 are respectively connected to PCs PC_A0, PC_B0, and PC_C0. In addition, the network Net_A1 is connected to a PC PC_A1 and a server SV_A1; the network Net_B1 is connected to a PC PC_B1 and a server SV_B1; and the network Net_C1 is connected to a PC PC_C1 and a server SV_C1.

Each PC such as the PC PC_A1 transmits, for example, a print request and device information on simple network management protocol (SNMP) to the MFP 9. The MFP 9 transfers, for example, file information formed through scan processing to the server SV_A1 and the like. Note that the transmission of the print request and device information on SNMP, the transfer of the file information formed through scan processing, and the like described above are examples, and other communication may also be performed.

The communication control box 971 restricts communication between the network system Net_A, the network system Net_B, and the network system Net_C and also enables communication between the network system Net_A and the MFP 9, communication between the network system Net_B and the MFP 9, and communication between the network system Net_C and the MFP 9.

Table 1 below illustrates examples of network addresses of the networks.

TABLE 1

| Network | Network address/netmask | VLAN | Explanation |
|---|---|---|---|
| Net_A0 | 192.168.1.0/24 | — | |
| Net_A0 | 192.168.10.0/24 | — | |
| Net_B0 | 172.16.1.0/24 | 10 | |
| Net_B1 | 172.16.10.0/24 | — | |
| Net_C0 | 10.0.1.0/24 | 30 | |
| Net_C1 | 10.0.10.0/24 | — | |
| Net_I | 203.0.113.0/29 | — | Segment for Internet access |

As illustrated in Table 1, the network address of the network Net_A0 is "192.168.1.0/24". The network address of the network Net_A1 is "192.168.10.0/24". The network address of the network Net_B0 is "172.16.1.0/24". The network address of the network Net_B1 is "172.16.10.0/24". The network address of the network Net_C0 is "10.0.1.0/24". The network address of the network Net_C1 is "10.0.10.0/24". The network address of the network Net_I is "203.0.113.0/29". Note that the network Net_I is a segment for internet access.

In addition, as illustrated in Table 1 as an example, the VLAN 10 communication protocol can be performed in the network Net_B0, and the VLAN 30 communication protocol can be performed in the network Net_C0.

As illustrated in Table 1, unique network addresses are set for the networks. Actually, aside from the above configuration example, at least servers that directly communicate with the MFP 9 have different IP addresses. Even in a case where servers that directly communicate with the MFP 9 have the same IP address, at least static NAPT is set.

Next, Table 2 below illustrates IP addresses and configuration in the entire system.

TABLE 2

| Device | IP address/netmask | Default gateway | Explanation |
|---|---|---|---|
| MFP | 192.168.1.10/24 | 192.168.1.1/24 | MFP |
| PC_A0 | 192.168.1.100/24 | 192.168.1.1/24 | |
| R_A | 192.168.1.1/24 192.168.10.1/24 | — | Router |
| PC_A1 | 192.168.10.100/24 | 192.168.10.1/24 | |
| SV_A1 | 192.168.10.11/24 | 192.168.10.1/24 | |
| PC_B0 | 172.16.1.100/24 | 172.16.1.1/24 | |
| R_B | 172.16.1.1/24 172.16.10.1/24 | — | Router |
| PC_B1 | 172.16.10.100/24 | 172.16.10.1/24 | |
| SV_B1 | 172.16.10.11/24 | 172.16.10.1/24 | |
| PC_C0 | 10.0.1.100/24 | 10.0.1.1/24 | |
| R_C | 10.0.1.1/24 10.0.10.1/24 203.0.113.2/29 | 203.0.113.1/29 | Router Capable of Transmitting/Receiving Packet To/From Internet |
| PC_C1 | 10.0.10.100/24 | 10.0.10.1/24 | |
| SV_C1 | 10.0.10.11/24 | 10.0.10.1/24 | |

As illustrated in Table 2, the IP address of the MFP 9 is "192.168.1.10/24", and the default gateway thereof is "192.168.1.1/24". The IP address of the PC PC_A0 is "192.168.1.100/24", and the default gateway thereof is "192.168.1.1/24". The IP address of the router R_A is "192.168.1.1/24", and a sub-net mask thereof is "192.168.10.1/24".

The IP address of the PC PC_A1 is "192.168.10.100/24", and the default gateway thereof is "192.168.10.1/24". The 1P address of the server SV_A1 is "192.168.10.11/24", and the default gateway thereof is "192.168.10.1/24". The IP address of the PC PC_B0 is "172.16.1.100/24", and the default gateway thereof is "172.16.1.1/24".

The IP address of the router R_B is "172.16.1.1/24", and a sub-net mask thereof is "172.16.10.1/24". The IP address of the PC PC_B1 is "172.16.10.100/24", and the default gateway thereof is "172.16.10.1/24". The IP address of the server SV_B1 is "172.16.10.11/24", and the default gateway thereof is "172.16.10.1/24". The IP address of the PC PC_C0 is "10.0.1.100/24", and the default gateway thereof is "10.0.1.1/24".

The IP address of the router R_C capable of transmitting packet information to the Internet and sub-net masks thereof are "10.0.1.1/24", "10.0.10.1/24", and "203.0.113.2/29", and the default gateway thereof is "203.0.113.1/29". The IP address of the PC PC_C1 is "10.0.10.100/24", and the default gateway thereof is "10.0.10.1/24". The IP address of the server SV_C1 is "10.0.10.11/24", and the default gateway thereof is "10.0.10.1/24".

As illustrated in Table 2, a single IP address that enables communication via a network is allocated to each of the PCs and the servers. A plurality of IP addresses is allocated to the routers such that communication via each connected network can be performed. Note that although the number of servers and the number of routers are logically one, a plurality of apparatuses may be provided to form a redundant configuration.

Functions of MFP and Communication Control Box

Figure 11:
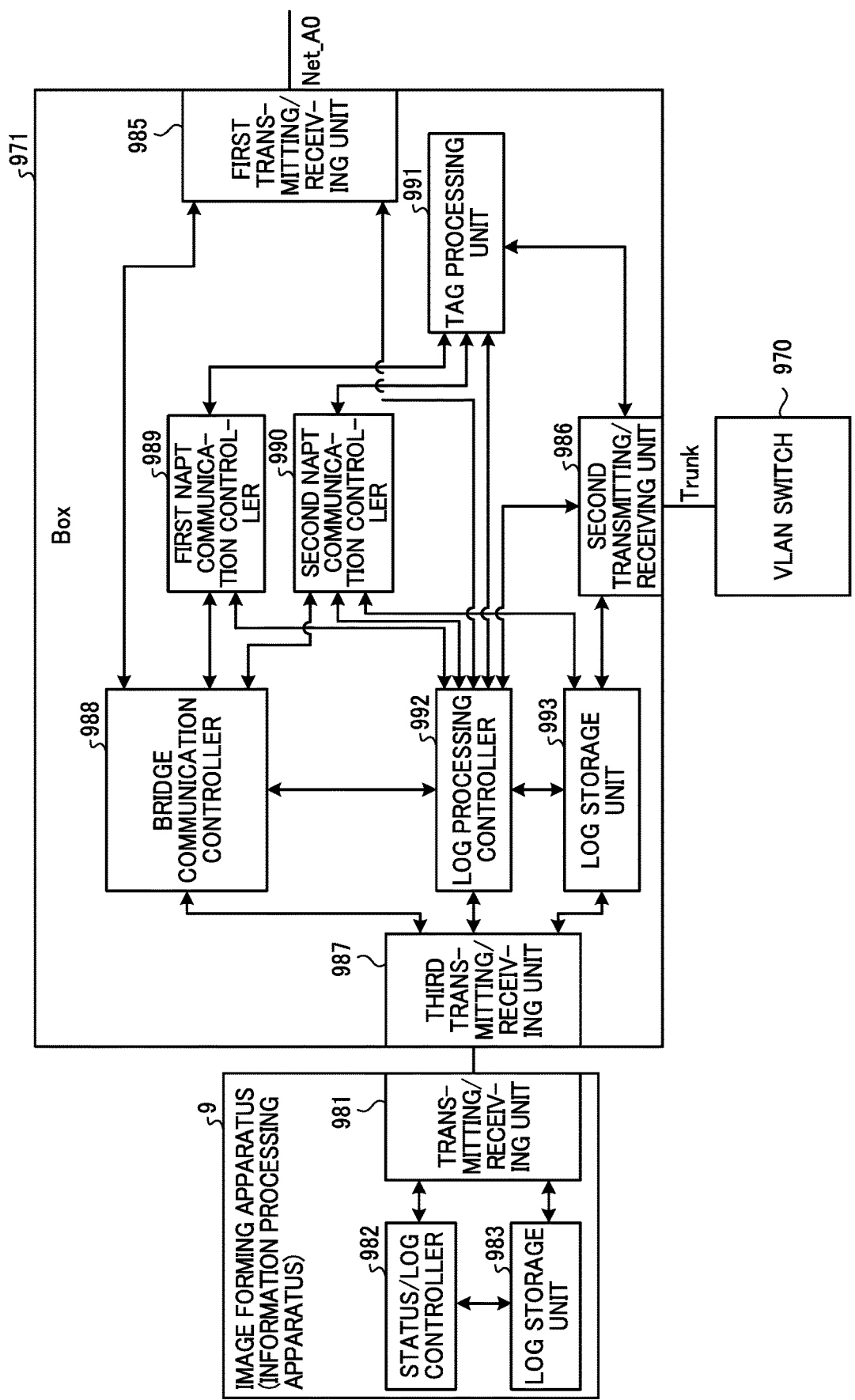
FIG. 11 is a block diagram illustrating examples of functional configurations of the MFP and a communication control box, according to an embodiment.

FIG. 11 illustrates functions each implemented by a controller (CPU) in the MFP 9 or the communication control box 971 executing a communication control program stored in a storage such as a ROM, RAM, or HDD.

That is, the CPU 901 of the MFP 9 executes the communication control program to execute functions of a transmitting/receiving unit 981, a status/log controller 982 (an example of a status-notification sending unit), and a log storage unit 983. For example, the status/log controller 982 adjusts the redundancy, storage capacity, and the like of log information on the basis of setting of a security mode or the like. The log storage unit 983 stores the log information transmitted from the communication control box 971 in a memory such as the HDD 909. The transmitting/receiving unit 981 transmits/receives various kinds of information, such as a message and the log information, to/from the communication control box 971 via the network.

Meanwhile, the CPU of the communication control box 971 executes the communication control program to implement functions of a first transmitting/receiving unit 985, a second transmitting/receiving unit 986, a third transmitting/receiving unit 987 (an example of an obtaining unit and a transmitting unit), a bridge communication controller 988, a first network address port translation (NAPT) communication controller 989, and a second NAPT communication controller 990. The CPU of the communication control box 971 further implements functions of a tag processing unit 991, a log processing controller 992, and a log storage unit 993.

Although the functions of the transmitting/receiving unit 981, the status/log controller 982, and the log storage unit 983 of the MFP 9 are implemented by software using the communication control program in the above description, some or all of the functions may also be implemented by hardware such as an IC. Similarly, although the first transmitting/receiving unit 985, the second transmitting/receiving unit 986, the third transmitting/receiving unit 987, the bridge communication controller 988, the first NAPT communication controller 989, and the second NAPT communication controller 990 of the communication control box 971 are implemented by software using the communication control program in the above description, some or all of the functions may also be implemented by hardware such as an IC.

The communication control program may be recorded on a non-transitory computer-readable storage medium, such as a CD-ROM or a flexible disk (FD), as file data of an installable format or an executable format and be provided. The communication control program may alternatively be recorded on a non-transitory computer-readable storage medium, such as a CD-R, a DVD, a Blu-ray (registered trademark) disc, or a semiconductor memory, and be provided. The communication control program may further alternatively be installed via a network, such as the Internet, and be provided. The communication control program may further alternatively be incorporated in advance in a ROM or the like of a device and be provided.

Each of the transmitting/receiving unit 981, the first transmitting/receiving unit 985, the second transmitting/receiving unit 986, and the third transmitting/receiving unit 987 receives packet information transmitted via a network and transmits the packet information. Each of the transmitting/receiving unit 981, the first transmitting/receiving unit 985, the second transmitting/receiving unit 986, and the third transmitting/receiving unit 987 may be, for example, a network interface for Ethernet (registered trademark) communication, a PCI-express card interface, a USB interface, or the like.

The bridge communication controller 988 determines a destination of the packet information received through each of the first transmitting/receiving unit 985, the second transmitting/receiving unit 986, and the third transmitting/receiving unit 987 and, for example, overwrites the packet information. Each of the first NAPT communication controller 989 and the second NAPT communication controller 990 determines a destination of the packet information received through each of the first transmitting/receiving unit 985, the second transmitting/receiving unit 986, and the third transmitting/receiving unit 987 and, for example, overwrites the packet information. Each of the first NAPT communication controller 989 and the second NAPT communication controller 990 has another NAPT table for NAPT processing and, by using the NAPT table, converts an IP address and a port number (NAPT processing).

Note that for the first NAPT communication controller 989 and the second NAPT communication controller 990, network resources, such as a routing table, NAPT table, and session table (table for managing a start port and an end port of communication on TCP/UDP), are isolated. That is, the first NAPT communication controller 989 and the second NAPT communication controller 990 have different network resources.

The tag processing unit 991 adds or deletes a VLAN tag. That is, the tag processing unit 991 embeds corresponding "VLAN identification information (VLAN ID (tag))" in a frame for a preset port or deletes a tag embedded in a frame.

Note that a frame with no tag may be transferred by the second transmitting/receiving unit 986, the tag does not have to be embedded depending on a communication protocol.

On the basis of the status notification from the MFP 9, the log processing controller 992 (an example of a log-information generating unit and a processing-mode changing unit) sets a detail level of the log information or sets an amount of the log information to be transmitted. The log processing controller 992 further writes the generated log information to the log storage unit 993.

Configuration Screen

Figure 12:
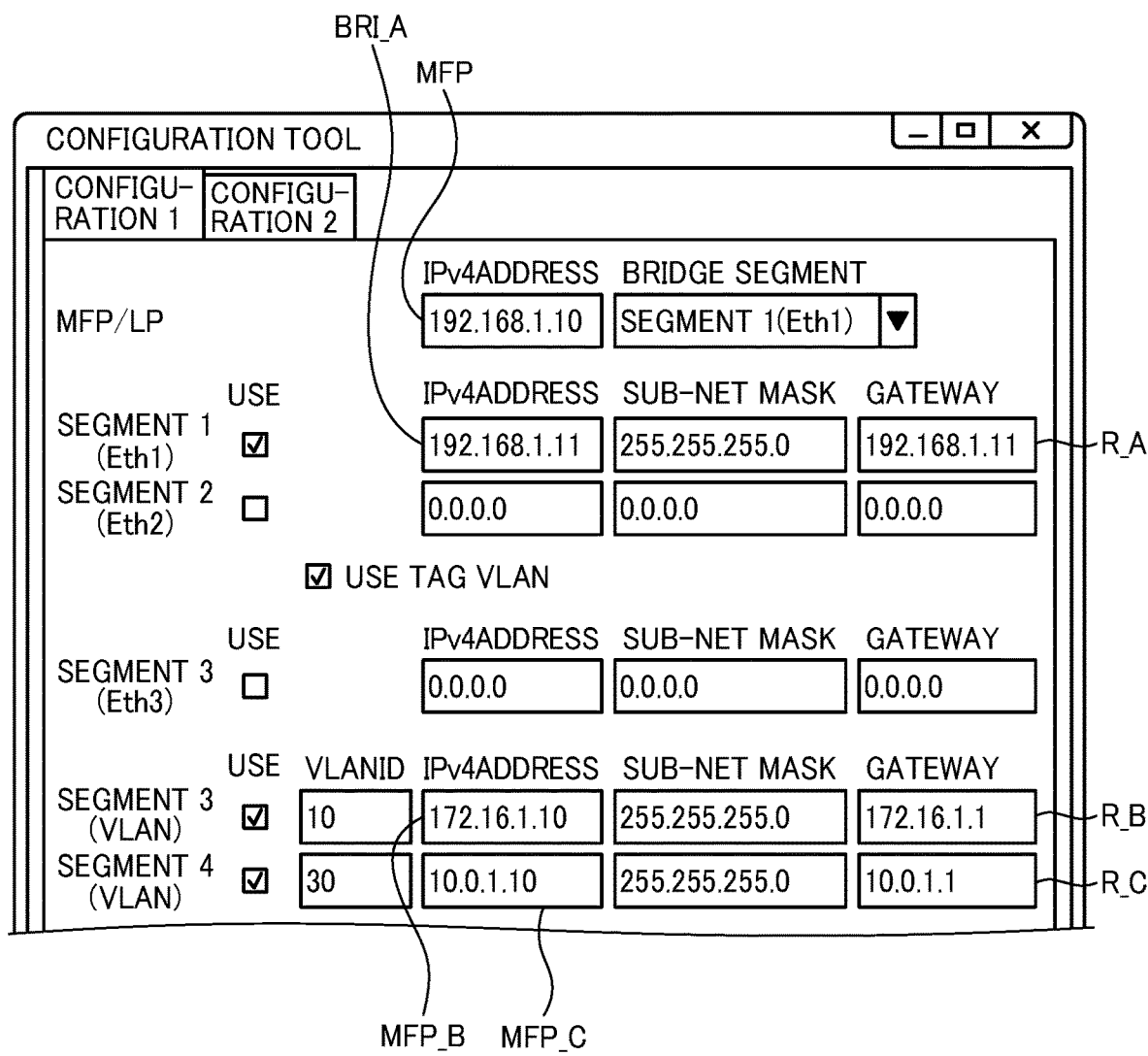
FIG. 12 illustrates an example of a basic configuration screen of the communication control box, according to an embodiment.

FIG. 12 illustrates an example of a basic configuration screen of the communication control box 971. This basic configuration screen is displayed on, for example, a PC of an administrator of the network communication system 1 according to the embodiment. In the case of the example in FIG. 12, the basic configuration screen includes an input field of an IP address (an Internet protocol version 4 (IPv4) address or an IPv6 address in this example) of the MFP 9, input fields of IP addresses of gateways of the routers R_A to R_C and the like, an input field of an IP address BRI_A of the bridge communication controller 988, and the like. In addition, in the case of the example in FIG. 12, the basic configuration screen further includes a checkbox for adding a checkmark (corresponding to performing a selection operation) if a tag VLAN is used, and input fields of VLAN IDs, IPv4 addresses, sub-net masks, and gateways of VLAN segments.

The example in FIG. 12 illustrates that the segments 3 and 4 are used as VLAN segments and have VLAN IDs "10" and "30" and IPv4 addresses of "172.16.1.10" and "10.0.1.10", respectively. In addition, the example in FIG. 12 illustrates that the router R_B with the IP address "172.16.1.1" is used for the segment 3 and that the router R_C with the IP address "10.0.1.10" is used for the segment 4.

Figure 13:
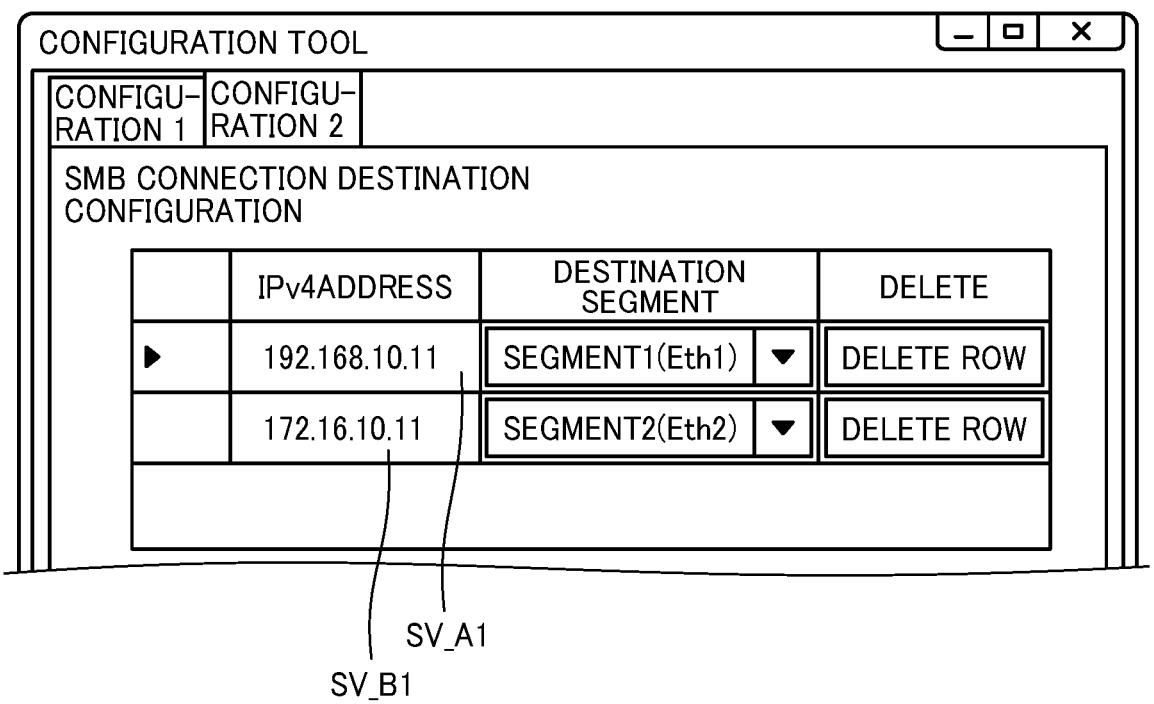
FIG. 13 illustrates an example of a server configuration screen of the communication control box, according to an embodiment.

FIG. 13 illustrates an example of a server configuration screen of the communication control box 971. This server configuration screen is also displayed on, for example, a PC of an administrator of the network communication system 1 according to the embodiment. In the case of the example in FIG. 13, the server configuration screen includes input fields of IP addresses (IPv4 addresses) of the servers SV_A1 and SV_B1. The values set on this configuration screen are used for device communication control.

Note that the IP address, netmask, gateway address, and the like may be obtained on the Dynamic Host Configuration Protocol (DHCP). In addition, the communication control box 971 obtains a MAC address of the router R_A from an IP address of the router R_A by using an address resolution protocol (ARP), which is a communication protocol for obtaining a MAC address of Ethernet (registered trademark) from an IP address. Similarly, the MAC address of the MFP 9 is also obtained by using the IP address of the MFP 9. It is needless to say that the MAC addresses may be directly registered. However, the system can be easily operated if management is based on the IP addresses without registering the MAC addresses.

Figure 14:
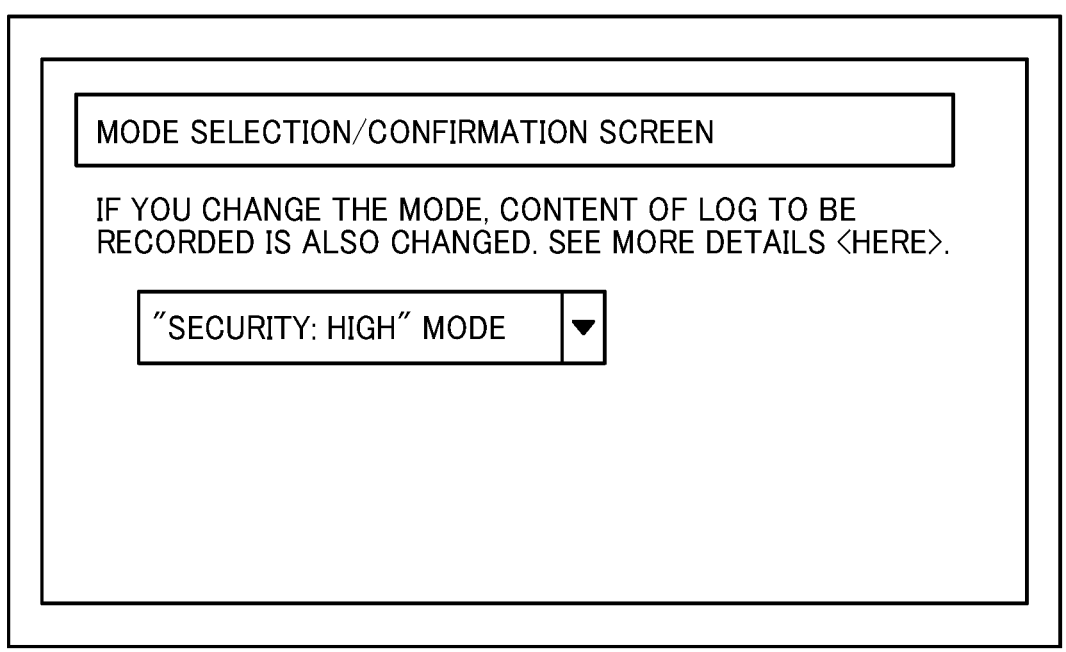
FIG. 14 illustrates an example a mode selection/confirmation screen of the MFP, according to an embodiment.

FIG. 14 illustrates an example a security-mode selection/confirmation screen of the MFP 9. In a case of the network communication system 1 according to the embodiment, the MFP 9, which is an example of an image processing apparatus, can designate a processing mode of log information in the form of "security mode". For example, in a case where "security mode: high", a high level of security can be maintained by recording a large amount of log information (increasing the information amount of log information to be recorded) transmitted from the communication control box 971.

Similarly, in a case where "security mode: low", the amount of log information transmitted from the communication control box 971 is reduced, and the level of security is decreased. However, it is possible to prevent a drawback that the large amount of log information increases a processing load of the MFP 9 and that a memory area of the log storage unit 983 of the MFP 9 becomes scarce.

In the example in FIG. 14, "security mode: high" is selected. The information indicating the processing mode of the log information selected on the MFP 9 in this manner is sent to the communication control box 971. The communication control box 971 transmits the log information to the MFP 9 with the information amount and transmission frequency corresponding to the processing mode of the log information designated by the MFP 9.

Figure 15:
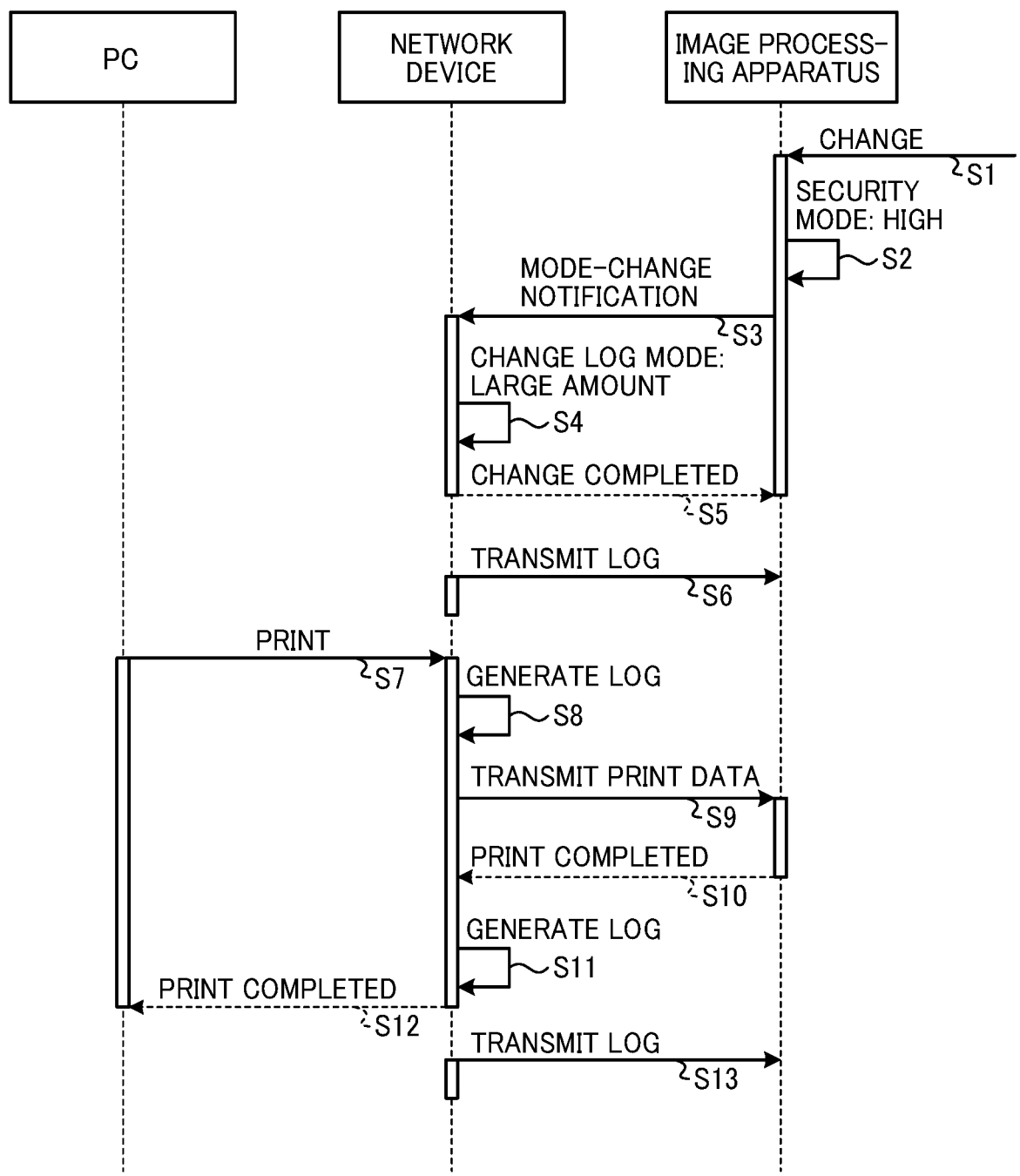
FIG. 15 is a flowchart illustrating a flow from setting of a processing mode of log information to recording of log information, according to an embodiment.

FIG. 15 is a flowchart illustrating the flow from setting of the processing mode of log information to recording of log information. In FIG. 15, the image processing apparatus corresponds to the MFP 9. In addition, the network device corresponds to the communication control box 971. The PC is a PC of a user.

In the flowchart in FIG. 15, in step S1, a user performs a designating operation for changing a security mode on the operation panel 940 of the MFP 9. Thus, the status/log controller 982 of the MFP 9 displays the security-mode selection/confirmation screen of the MFP 9 illustrated in FIG. 14 on the operation panel 940. The user performs an operation on the operation panel 940 to input a desired security mode on the security-mode selection/confirmation screen. Thus, the status/log controller 982 sets the security mode designated by the user in the MFP 9 (step S2). In the example in FIG. 15, "security mode: high" is set in the MFP 9.

Subsequently, the status/log controller 982 of the MFP 9 sends, to the communication control box 971, a mode-change notification (an example of a status notification) indicating that the security mode of the MFP 9 is changed (step S3). The mode-change notification is a notification indicating a change in log level, such as a change in packet information for which the MFP 9 permits reception and packet information for which the MFP 9 prohibits reception. Thus, a required security status can be set, and the security can be strengthened.

The communication control box 971 receives this mode-change notification through the third transmitting/receiving unit 987. On the basis of the received mode-change notification, the log processing controller 992 changes a log mode for controlling a transmission mode of log information to be transmitted to the MFP 9 (step S4). In the case of the example in FIG. 15, the log processing controller 992 of the communication control box 971 changes the log mode to a mode of transmitting a large amount of the log information to the MFP 9. Specifically, the log processing controller 992 of the communication control box 971 changes the transmission frequency of transmitting the log information to the MFP 9. In this manner, in the network communication system 1 according to the embodiment, flexible setting of the log information can be performed.

Upon completion of the change in log mode (step S5), the third transmitting/receiving unit 987 of the communication control box 971 transmits, to the MFP 9, the log information corresponding to the information amount designated by the MFP 9 (step S6). For example, the third transmitting/ receiving unit 987 of the communication control box 971 transmits, to the MFP 9, the log information each time the log information is generated.

In this example, even in a case where a low transmission frequency of the log information is set on the basis of the mode-change notification (step S3) from the MFP 9, if a remaining amount of a memory area of the log storage unit 993 for storing the log information becomes less than or equal to a predetermined remaining amount, the third transmitting/receiving unit 987 of the communication control box 971 transmits the log information to the MFP 9. This can prevent a drawback that the log storage unit 993 of the communication control box 971 overflows with the log information.

Next, the flow of log information processing in a case where a print job designated on the user's PC is executed will be described. Upon reception of a print request from the PC 270 (step S7) through the first transmitting/receiving unit 985 or the second transmitting/receiving unit 986 of the communication control box 971, the log processing controller 992 generates log information corresponding to the print execution (step S8). The third transmitting/receiving unit 987 of the communication control box 971 transmits the generated log information to the MFP 9 together with the print data (step S9).

In this example, even in a case where a high transmission frequency of the log information is set on the basis of the mode-change notification (step S3) from the MFP 9, while the print data from the PC is being transmitted to the MFP 9, the third transmitting/receiving unit 987 of the communication control box 971 prohibits transmission of the log information to the MFP 9. That is, while the print data is being transmitted to the MFP 9, the log information is not transmitted to the MFP 9. This can prevent a drawback that the load of the MFP 9 is increased by processing of the print data and processing of the log information. The print data is an example of predetermine data. Image data being uploaded to the MFP 9 may be another example of predetermined data.

In addition, in response to reception of a log-information transmission stop notification from the MFP 9, the third transmitting/receiving unit 987 of the communication control box 971 stops transmission of the log information to the MFP 9 until reception of a transmission-stop cancellation notification. Thus, while the MFP 9 is performing heavy load processing, the MFP 9 stops receiving the log information, and once the processing is finished, the MFP 9 can start receiving the log information again.

Subsequently, the status/log controller 982 of the MFP 9 stores the log information received from the communication control box 971 in, for example, the log storage unit 983 such as the HDD 909. In addition, on the basis of the received print data, the status/log controller 982 of the MFP 9 controls the printer device 932 to execute printing, and once the printing is completed, the status/log controller 982 sends a print completion notification to the communication control box 971 (step S10).

The log processing controller 992 of the communication control box 971 receives the print completion notification and generates log information corresponding to the print completion (step S11). The first transmitting/receiving unit 985 or the second transmitting/receiving unit 986 of the communication control box 971 transmits, to the PC, the generated log information indicating that the print has been completed (step S12). The log processing controller 992 of the communication control box 971 further generates log information indicating that the log information corresponding to the print completion has been transmitted to the PC. The third transmitting/receiving unit 987 transmits the generated log information to the MFP 9 (step S13). The status/log controller 982 of the MFP 9 stores the log information in the log storage unit 983 as described above.

As is clear from the above description, in the network communication system 1 according to the embodiment, the communication control box 971 transmits the log information to the MFP 9, and the MFP 9 records (stores) the log information. In this processing, the MFP 9 sends, to the communication control box 971, a status notification about the MFP 9, such as a notification of a processing mode or a notification of a size (capacity) of a memory area for storing the log information in the MFP 9. In accordance with the status of the MFP 9, the communication control box 971 changes a detail level or a transmission frequency of the log information. This makes it possible to obtain the log information from the network device in the processing mode designated by the MFP 9 and prevent a drawback of storing or transferring unnecessary log information.

In addition, both the communication control box 971 and the WP 9 frequently needs the log information. Thus, by causing the log levels to coordinate with each other, the user can easily manage and operate the system. In addition, by adjusting the transmission frequency of the log information, the processing load of the MFP 9 can be adjusted to an appropriate processing load.

With a method in the related art for storing and transferring the log information, the log information is stored or transferred without considering the status of devices, thereby causing a drawback that unnecessary log information is stored or transferred.

According to one or more embodiments of the present disclosure, storing or transferring unnecessary log information can be prevented.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:
1. A network device, comprising:
circuitry configured to
generate log information;
receive a status notification from an image processing device that receives and stores the generated log information, the status notification being designated by the image processing device;
determine, based on the received status notification, a new processing mode;
change a processing mode of the log information to the determined new processing mode; and transmit, to the image processing device and based on the changed processing mode, the generated log information; and a network device memory to store the generated log information.

2. The network device of claim 1, wherein the circuitry is further configured to change a detail level of the log information or change an amount of the log information to be transmitted, based on the status notification from the image processing device.

3. The network device of claim 1, wherein the status notification is a notification indicating a change in a security level or a notification indicating a change in a log level.

4. The network device of claim 1, wherein the circuitry is further configured to change a transmission frequency of transmitting the log information to the image processing device, based on the received status notification.

5. The network device of claim 1, wherein when a low transmission frequency of the log information is set, the circuitry is further configured to transmit the log information to the image processing device when a remaining amount of a memory area in the network device memory in which the log information is to be stored becomes less than or equal to a predetermined remaining amount.

6. The network device of claim 1, wherein when a high transmission frequency of the log information is set, the circuitry is further configured to stop transmission of the log information to the image processing device during a time period when predetermined data is being transmitted.

7. The network device of claim 1, wherein the circuitry is further configured to stop transmission of the log information to the image processing device, in response to reception of a log-information transmission stop notification from the image processing device.

8. A network communication system, comprising:

the network device of claim 1; and the image processing device, which receives and stores the generated log information transmitted from the network device.

9. The network device of claim 1, wherein the circuitry is further configured to change a transmission frequency of transmitting the log information to the image processing device, based on receiving a notification indicating a change in a security level set by the image processing device.

10. A non-transitory computer-readable storage medium storing a program causing a computer to perform a method comprising:

generating log information;

receiving a status notification from an image processing device that receives and stores the generated log information, the status notification being designated by the image processing device;

determining, based on the received status notification, a new processing mode;

changing a processing mode of the log information to the determined new processing mode; and transmitting, to the image processing device, based on the changed processing mode, the generated log information.

* * * * *